United States Patent
Zewail et al.

(10) Patent No.: US 12,294,534 B2
(45) Date of Patent: May 6, 2025

(54) FREQUENCY SELECTIVE PHASE TRACKING REFERENCE SIGNAL (PTRS) ALLOCATION

(71) Applicant: QUALCOMM Incorporated, San Diego, CA (US)

(72) Inventors: Ahmed Abdelaziz Ibrahim Abdelaziz Zewail, San Diego, CA (US); Zhifei Fan, San Diego, CA (US); Xiaoxia Zhang, San Diego, CA (US); Tao Luo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 17/482,100

(22) Filed: Sep. 22, 2021

(65) Prior Publication Data
US 2022/0109537 A1  Apr. 7, 2022

Related U.S. Application Data

(60) Provisional application No. 63/087,151, filed on Oct. 2, 2020.

(51) Int. Cl.
*H04L 5/00*  (2006.01)
*H04W 72/0453*  (2023.01)

(52) U.S. Cl.
CPC .......... *H04L 5/0037* (2013.01); *H04L 5/0053* (2013.01); *H04W 72/0453* (2013.01)

(58) Field of Classification Search
CPC . H04L 5/0053; H04L 5/0037; H04L 5/0094; H04W 72/0453
See application file for complete search history.

(56) References Cited

U.S. PATENT DOCUMENTS 1,152,994 A * 9/1915 Vitek ................... A01D 34/664
 56/13.6
2008/0039098 A1* 2/2008 Papasakellariou .. H04W 72/542
 455/442

(Continued)

FOREIGN PATENT DOCUMENTS

WO  WO-2018175709 A1 *  9/2018  ......... H04L 27/2613

OTHER PUBLICATIONS

3GPP TSG RAN WG1 Meeting#92, R1-1802150 Title: Text proposal on UL collision of more than 2 UL channel in 36.213 (Year: 2018).*

(Continued)

*Primary Examiner* — Christopher M Crutchfield
*Assistant Examiner* — Abusayeed M Haque
(74) *Attorney, Agent, or Firm* — Arun Swain

(57) ABSTRACT

This disclosure provides systems, methods, and apparatus, including computer programs encoded on computer storage media, for enabling user equipment (UE) and a base station (BS) to communicate using a set of frequency resources in which a subset of frequency resources include a phase tracking reference signal (PTRS). In one aspect, the UE may measure the PTRS in the subset of frequency resources, and select a phase noise compensation that is used to demodulate a communication from the BS. The subset of frequency resources may be selected from the set frequency resources based on channel conditions of different subsets of frequency resources. The BS may provide an indication of the selected subset of frequency resources to the UE, such as in control information that schedules the communication from the BS.

30 Claims, 13 Drawing Sheets

(56) References Cited

U.S. PATENT DOCUMENTS

| | | |
|---|---|---|
| 2010/0111212 A1 | 5/2010 | Sun et al. |
| 2017/0230780 A1* | 8/2017 | Chincholi ............. H04L 1/0036 |
| 2018/0091350 A1* | 3/2018 | Akkarakaran ........ G01S 13/346 |
| 2020/0077419 A1 | 3/2020 | Lee et al. |
| 2020/0128357 A1 | 4/2020 | Kim et al. |
| 2020/0314817 A1* | 10/2020 | Sun ....................... H04W 72/23 |
| 2021/0168011 A1* | 6/2021 | Davydov .............. H04L 5/0048 |

OTHER PUBLICATIONS

International Search Report and Written Opinion—PCT/US2021/051786—ISA/EPO—Jan. 10, 2022.

* cited by examiner ns systems and devices

FREQUENCY SELECTIVE PHASE TRACKING REFERENCE SIGNAL (PTRS) ALLOCATION

CROSS REFERENCE

The present Application for Patent claims the benefit of U.S. Provisional Patent Application No. 63/087,151 by ZEWAIL et al., entitled "FREQUENCY SELECTIVE PHASE TRACKING REFERENCE SIGNAL (PTRS) ALLOCATION," filed Oct. 2, 2020, assigned to the assignee hereof, and expressly incorporated by reference herein.

FIELD OF TECHNOLOGY

The following relates to wireless communications, including frequency selective phase tracking reference signal (PTRS) allocation.

BACKGROUND

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication at an apparatus of a user equipment (UE). The apparatus can include a first interface, a second interface, and a processing system. In some implementations, the processing system can be configured to identify a set of frequency resources configured for phase tracking reference signal (PTRS) transmissions. In some implementations, the first interface or the second interface can be configured to obtain, from a base station (BS), control information indicating a first PTRS associated with a first communication is transmitted using a subset of frequency resources from the set of frequency resources, where the first communication spans the set of frequency resources. In some implementations, the processing system can be configured to select a phase noise compensation for the first communication.

Another innovative aspect of the subject matter described in this disclosure can be implemented in a method of wireless communication at an apparatus of a UE. In some implementations, the method can include identifying a set of frequency resources configured for PTRS transmissions, receiving, from a BS, control information indicating a first PTRS associated with a first communication is transmitted using a subset of frequency resources from the set of frequency resources, where the first communication spans the set of frequency resources, and selecting a phase noise compensation for the first communication.

Another innovative aspect of the subject matter described in this disclosure can be implemented in another apparatus for wireless communication at an apparatus of a UE. In some implementations, the apparatus can include means for identifying a set of frequency resources configured for PTRS transmissions, receiving, from a BS, control information indicating a first PTRS associated with a first communication is transmitted using a subset of frequency resources from the set of frequency resources, where the first communication spans the set of frequency resources, and selecting a phase noise compensation for the first communication.

Another innovative aspect of the subject matter described in this disclosure can be implemented in a non-transitory computer-readable medium storing code for wireless communication at an apparatus of a UE. In some implementations, the code can include instructions executable by a processor to identify a set of frequency resources configured for PTRS transmissions, receive, from a BS, control information indicating a first PTRS associated with a first communication is transmitted using a subset of frequency resources from the set of frequency resources, where the first communication spans the set of frequency resources, and select a phase noise compensation for the first communication.

In some implementations, the method, apparatuses, and non-transitory computer-readable medium can include operations, features, means, or instructions for receiving or obtaining, from the BS, configuration information indicating the set of frequency resources available for PTRS transmissions as a number of PTRS tones per RB within the set of frequency resources.

In some implementations of the method, apparatuses, and non-transitory computer-readable medium described herein, the configuration information can provide a set of frequency sub-bands as the set of frequency resources, a set of PTRS patterns within at least one of the frequency sub-bands, or any combinations thereof, and where the control information indicates a first frequency sub-band as the subset of frequency resources, and a first PTRS pattern, for the first PTRS.

In some implementations, the method, apparatuses, and non-transitory computer-readable medium can include operations, features, means, or instructions for receiving or obtaining, from the BS, a PTRS index value in the control information, and selecting, based on the PTRS index value, the subset of frequency resources and a pattern of resource elements (REs) within the subset of frequency resources that contain the first PTRS.

In some implementations, the method, apparatuses, and non-transitory computer-readable medium can include operations, features, means, or instructions for identifying a resource partition indication in the control information that indicates a first resource partition within a set of resource blocks (RBs) allocated for communications between the UE and the BS, identifying an offset indication in the control information that indicates a first offset within the first resource partition, and selecting the subset of frequency resources based on the first resource partition and the first offset. In some implementations, the method, apparatuses, and non-transitory computer-readable medium can include operations, features, means, or instructions for identifying a PTRS pattern indication in the control information that indicates a resource element (RE) pattern for the first PTRS within the subset of frequency resources.

In some implementations, the method, apparatuses, and non-transitory computer-readable medium can include operations, features, means, or instructions for measuring one or more reference signals from the BS, where the one or more reference signals span set of frequency resources, identifying, based on the measuring, a first subset of frequency resources having a channel condition that meets or exceeds channel conditions of one or more other subsets of frequency resources, and transmitting, to the BS, an indication of the first subset of frequency resources, and where the control information indicates the first subset of frequency resources contains the first PTRS.

In some implementations of the method, apparatuses, and non-transitory computer-readable medium described herein, the first PTRS includes a first number of tones within the first subset of frequency resources based on a frequency density parameter associated with the set of frequency resources. In some implementations of the method, apparatuses, and non-transitory computer-readable medium described herein, the first number of tones within the first subset of frequency resources may be power boosted to provide an aggregate power level that matches a total power associated with a total number of PTRS tones that span the set of frequency resources.

In some implementations, the method, apparatuses, and non-transitory computer-readable medium can include operations, features, means, or instructions for transmitting or outputting, based on the measuring, a total number of tones requested for the PTRS for the first communication.

In some implementations, the method, apparatuses, and non-transitory computer-readable medium can include operations, features, means, or instructions for selecting a transport block (TB) size of the first communication based on an indicated TB size or an overhead parameter for TB size calculation, and a number of PTRS tones in the first subset of frequency resources. In some implementations of the method, apparatuses, and non-transitory computer-readable medium described herein, the TB size of the first communication may be adjusted relative to the indicated TB size or a calculated TB size to account for reduced PTRS overhead based on PTRS tones being transmitted only in the first subset of frequency resources. In some implementations of the method, apparatuses, and non-transitory computer-readable medium described herein, the control information indicates a TB size of the first communication that may be adjusted for a reduced PTRS overhead based on PTRS tones being transmitted only in the first subset of frequency resources.

In some implementations, the method, apparatuses, and non-transitory computer-readable medium can include operations, features, means, or instructions for receiving or obtaining, from the BS, control signaling to activate or deactivate PTRS frequency resource indications, where the control signaling may be received in one or more of radio resource control (RRC) signaling or a medium access control (MAC) control element (CE). In some implementations of the method, apparatuses, and non-transitory computer-readable medium described herein, the control signaling includes a threshold value of RBs for activating the PTRS frequency resource indications provided by the control information.

Another innovative aspect of the subject matter described in this disclosure can be implemented in an apparatus for wireless communication at an apparatus of a BS. The apparatus can include a first interface, a second interface, and a processing system. In some implementations, the processing system can be configured to identify a set of frequency resources available for a PTRS transmission to a UE. In some implementations, the first interface or the second interface can be configured to output control information indicating a subset of frequency resources from the set of frequency resources includes a first PTRS for a first communication between the BS and the UE, where the first communication spans the set of frequency resources. In some implementations, the first interface or the second interface can be configured to output the first communication and the first PTRS, where the first PTRS is transmitted in the subset of frequency resources.

Another innovative aspect of the subject matter described in this disclosure can be implemented in a method of wireless communication at an apparatus of a BS. In some implementations, the method can include identifying a set of frequency resources available for a PTRS transmission to a UE, transmitting, to the UE, control information indicating a subset of frequency resources from the set of frequency resources includes a first PTRS for a first communication between the BS and the UE, where the first communication spans the set of frequency resources, and transmitting, to the UE, the first communication and the first PTRS, where the first PTRS is transmitted in the subset of frequency resources.

Another innovative aspect of the subject matter described in this disclosure can be implemented in an apparatus for wireless communication at an apparatus of a BS. In some implementations, the apparatus can include means for identifying a set of frequency resources available for a PTRS transmission to a UE, transmitting, to the UE, control information indicating a subset of frequency resources from the set of frequency resources includes a first PTRS for a first communication between the BS and the UE, where the first communication spans the set of frequency resources, and transmitting, to the UE, the first communication and the first PTRS, where the first PTRS is transmitted in the subset of frequency resources.

Another innovative aspect of the subject matter described in this disclosure can be implemented in a non-transitory computer-readable medium storing code for wireless communication at an apparatus of a BS. In some implementations, the code can include instructions executable by a processor to identify a set of frequency resources available for a PTRS transmission to a UE, transmit, to the UE, control information indicating a subset of frequency resources from the set of frequency resources includes a first PTRS for a first communication between the BS and the UE, where the first communication spans the set of frequency resources, and transmit, to the UE, the first communication and the first PTRS, where the first PTRS is transmitted in the subset of frequency resources.

In some implementations, the method, apparatuses, and non-transitory computer-readable medium can include operations, features, means, or instructions for transmitting or outputting, to the UE, configuration information indicating the set of frequency resources available for PTRS transmissions as a number of PTRS tones per RB within the set of frequency resources.

In some implementations of the method, apparatuses, and non-transitory computer-readable medium described herein, the configuration information can provide a set of frequency sub-bands as the set of frequency resources, a set of PTRS patterns within at least one of the frequency sub-bands, or any combinations thereof, and where the control information indicates a first frequency sub-band as the subset of frequency resources, and a first PTRS pattern, for the first PTRS.

In some implementations, the method, apparatuses, and non-transitory computer-readable medium can include operations, features, means, or instructions for selecting a PTRS index value of the first PTRS based on the subset of frequency resources and a pattern of resource elements (REs) within the subset of frequency resources that contain the first PTRS, and transmitting or outputting, to the UE, the PTRS index value in the control information.

In some implementations, the method, apparatuses, and non-transitory computer-readable medium can include operations, features, means, or instructions for transmitting or outputting, in the control information, a location of the subset of frequency resources as a resource partition indication that indicates a first resource partition within a set of RBs allocated for communications between the UE and the BS, and an offset indication that indicates a first offset within the first resource partition. In some implementations, the method, apparatuses, and non-transitory computer-readable medium can include operations, features, means, or instructions for transmitting or outputting, in the control information, a PTRS pattern indication for a RE pattern for the first PTRS within the subset of frequency resources.

In some implementations, the method, apparatuses, and non-transitory computer-readable medium can include operations, features, means, or instructions for selecting, based on one or more of a measurement report from the UE, one or more measurements of a UE reference signal, one or more resource allocations to one or more other UEs, or any combinations thereof, a first subset of frequency resources from the set of frequency resources has a channel condition that meets or exceeds channel conditions of one or more other subsets of frequency resources, and where the control information indicates the first subset of frequency resources contains the first PTRS. In some implementations of the method, apparatuses, and non-transitory computer-readable medium described herein, the first PTRS may include a first number of tones within the first subset of frequency resources based on a frequency density parameter associated with the set of frequency resources.

In some implementations of the method, apparatuses, and non-transitory computer-readable medium described herein, the first number of tones within the first subset of frequency resources may be power boosted to provide an aggregate power level that matches a total power associated with a total number of PTRS tones that span the set of frequency resources.

In some implementations, the method, apparatuses, and non-transitory computer-readable medium can include operations, features, means, or instructions for receiving or obtaining, from the UE, an indication of a total number of tones requested for the PTRS for the first communication. In some implementations, the method, apparatuses, and non-transitory computer-readable medium can include operations, features, means, or instructions for selecting a TB size of the first communication based on an indicated TB size in the control information and a number of PTRS tones in the first subset of frequency resources. In some implementations of the method, apparatuses, and non-transitory computer-readable medium described herein, the TB size of the first communication may be adjusted relative to the indicated TB size to account for reduced PTRS overhead based on PTRS tones being transmitted only in the first subset of frequency resources.

In some implementations of the method, apparatuses, and non-transitory computer-readable medium described herein, the control information indicates a TB size of the first communication that may be adjusted for a reduced PTRS overhead based on PTRS tones being transmitted only in the first subset of frequency resources. In some implementations, the method, apparatuses, and non-transitory computer-readable medium can include operations, features, means, or instructions for transmitting or outputting, to the UE, control signaling to activate or deactivate PTRS frequency resource indications, where the control signaling may be transmitted in one or more of RRC signaling or a MAC-CE. In some implementations of the method, apparatuses, and non-transitory computer-readable medium described herein, the control signaling includes a threshold value of RBs for activating the PTRS frequency resource indications provided by the control information.

In some implementations of the method, apparatuses, and non-transitory computer-readable medium described herein, the first PTRS may be transmitted in a set of tones of the subset of frequency resources, and where different tones of the set of tones may have a different transmit power based on an estimated channel condition associated with each tone. In some implementations of the method, apparatuses, and non-transitory computer-readable medium described herein, the transmit power for the set of tones of the subset of frequency resources may be determined to provide utilization of a total available transmit power for the first PTRS. In some implementations of the method, apparatuses, and non-transitory computer-readable medium described herein, the BS selects a PTRS pattern that includes one or more zero power tones based on the estimated channel condition, the PTRS pattern being selected from a set of pre-defined patterns, and where an index of the PTRS pattern may be signaled to the UE via the control information.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
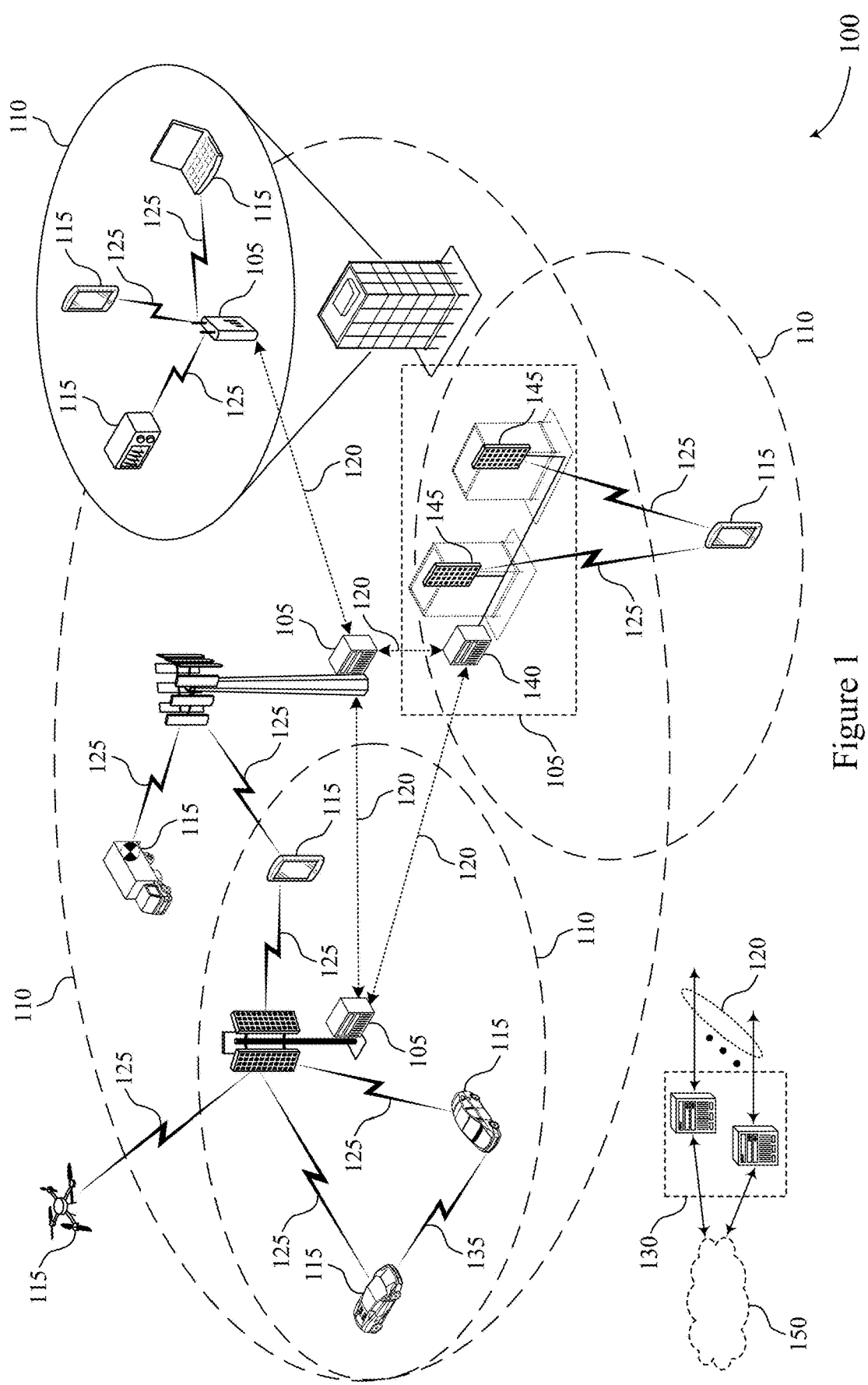
FIGS. 1 and 2 show example wireless communications systems that support frequency selective phase tracking reference signal (PTRS) allocation.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a base station (BS) may transmit one or more reference signals to aid a user equipment (UE) in demodulating and decoding transmissions. One such reference signal may be a phase tracking reference signal (PTRS) that may be used at a UE to compensate for oscillator phase noise. Oscillator phase noise may increase as a function of oscillator carrier frequency, and PTRS may be utilized at higher carrier frequencies, such as millimeter wave (mmW) frequencies for example, to mitigate such phase noise. Phase noise compensation may have performance losses in cases where a PTRS experiences interference or frequency selective fading. In some implementations, a BS may transmit a PTRS using one or more frequency sub-bands that are a subset of a total number of frequency sub-bands used for communications with a UE. The subset of frequency sub-bands may be selected as one or more sub-bands that have relatively good channel conditions compared to other of the total number of frequency sub-bands. The BS may provide an indication of the selected one or more sub-bands to the UE, and the UE may measure the PTRS in the one or more indicated sub-bands and perform phase noise compensation based on the measured PTRS.

In some implementations, the BS may select a subset of frequency resources from a set of frequency resources that are configured for communications with the UE for PTRS. The subset of frequency resources may be, for example, one or more sub-bands, one or more resource element (RE) interlaces, or combinations thereof. The BS may make such a selection, in some implementations, based on identified channel conditions associated with each sub-band of the total number of frequency sub-bands used for communications with the UE, channel conditions associated with one or more RE interlaces, or any combinations thereof. For example, the BS may measure one or more reference signals transmitted by the UE, such as a sounding reference signal (SRS), across one or more sub-bands. Based on the reference signal measurements, the BS may select the one or more sub-bands or RE interlaces that are to carry PTRS (such as a sub-band or RE interlace with a relatively high channel gain, a relatively low interference, or any combinations thereof). Additionally, or alternatively, the UE may measure one or more reference signals from the BS, such as a channel state information reference signal (CSI-RS), and transmit a measurement report to the BS that indicates measurements across multiple sub-bands and that the BS can use to select the subset of frequency resources to carry PTRS.

In some implementations, the BS may provide an indication of the selected subset of frequency resources to carry PTRS in control information that is provided to the UE. Such an indication may be provided, for example, in a scheduling downlink control information (DCI) communication to the UE. The indication of the selected subset of frequency resources may indicate, for example, a pattern or location of the PTRS within a frequency domain resource allocation from multiple configured patterns or locations (such as using a bit field in the scheduling DCI to dynamically select one of the multiple configured patterns or locations). The BS may select the subset of frequency resources, in some implementations, based on a UE request. Additionally, or alternatively, the BS and UE may adjust a transport block size (TBS) for a communication (such as a physical downlink shared channel (PDSCH) transmission) based on the actual number of PTRS tones in the set of frequency resources. In some implementations, the BS may activate or deactivate providing indications of the selected subset of frequency resources, such as through radio resource control (RRC) signaling, a medium access control (MAC) control element (CE), or any combinations thereof. Further, in some implementations, the BS may allocate a transmit power for different REs used for PTRS based on an estimated channel.

Particular implementations of the subject matter described in this disclosure can be implemented to realize one or more of the following potential advantages. For example, by transmitting PTRS in a selected subset of frequency resources having enhanced channel conditions compared to other subsets of frequency resources, phase noise compensation may be enhanced, which may improve communications reliability for the UE and BS. In some implementations, by configuring the UE with a number of available PTRS locations or patterns, the selected subset of frequency resources may be efficiently signaled to the UE in control information. Further, by enabling the activation or deactivation of PTRS transmissions in selected subsets of frequency resources, such techniques may be activated based on channel conditions or particular frequency resources associated with the BS and UE. Accordingly, the BS and the UE may facilitate greater communications efficiency and higher reliability based on the described techniques for PTRS transmission in selected subset of frequency resources.

FIG. 1 shows an example of a wireless communications system 100 that supports frequency selective PTRS allocation. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some examples of UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or other interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay base stations, among other examples, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more ($N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (such as over a carrier) and may be associated with an identifier for distinguishing neighboring cells (such as a physical cell identifier (PCID), a virtual cell identifier (VCID), or others). In some implementations, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the BS 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different, licensed or unlicensed, frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). ABS 105 may support one or multiple cells and also may support communications over the one or more cells using one or multiple component carriers.

In some implementations, a carrier may support multiple cells, and different cells may be configured according to different protocol types (such as MTC, narrowband IoT (NB-IoT), or enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, a set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a D2D communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In other cases, D2D communications are carried out between the UEs 115 without the involvement of a BS 105.

In some systems, the D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

ABS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (for example, a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some implementations, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, a BS 105 may configure PTRS transmissions that provide for phase noise compensation at a UE 115. In some implementations, a BS 105 may transmit a PTRS using a subset of frequency resources from a set of frequency resource used for communications between the UE 115 and BS 105, such as one or more frequency sub-bands that are a subset of a total number of frequency sub-bands used for communications between a UE 115 and BS 105. The subset of frequency resources may be selected as one or more frequency resources (such as frequency sub-bands) that have relatively good channel conditions compared to other of the total number of frequency sub-bands.

In some implementations, the BS 105 may provide an indication of the selected subset of frequency resources to the UE 115, and the UE 115 may measure the PTRS in the subset of frequency resources and use the PTRS measurements to perform phase noise compensation. The BS 105 may select the subset of frequency resources, in some implementations, based on identified channel conditions associated with each different subset of frequency resources of the set of frequency resources used for communications with the UE 115, channel conditions associated with one or more RE interlaces, or any combinations thereof. The channel conditions may be determined, for example, based at least in part on one or more of SRS measurements across different subsets of frequency resources made by the BS 105, a measurement report (such as a CSI report) provided by the UE 115, or any combinations thereof. In some implementations, the BS 105 may provide the indication of the selected subset of frequency resources in a scheduling DCI to the UE.

Figure 2:
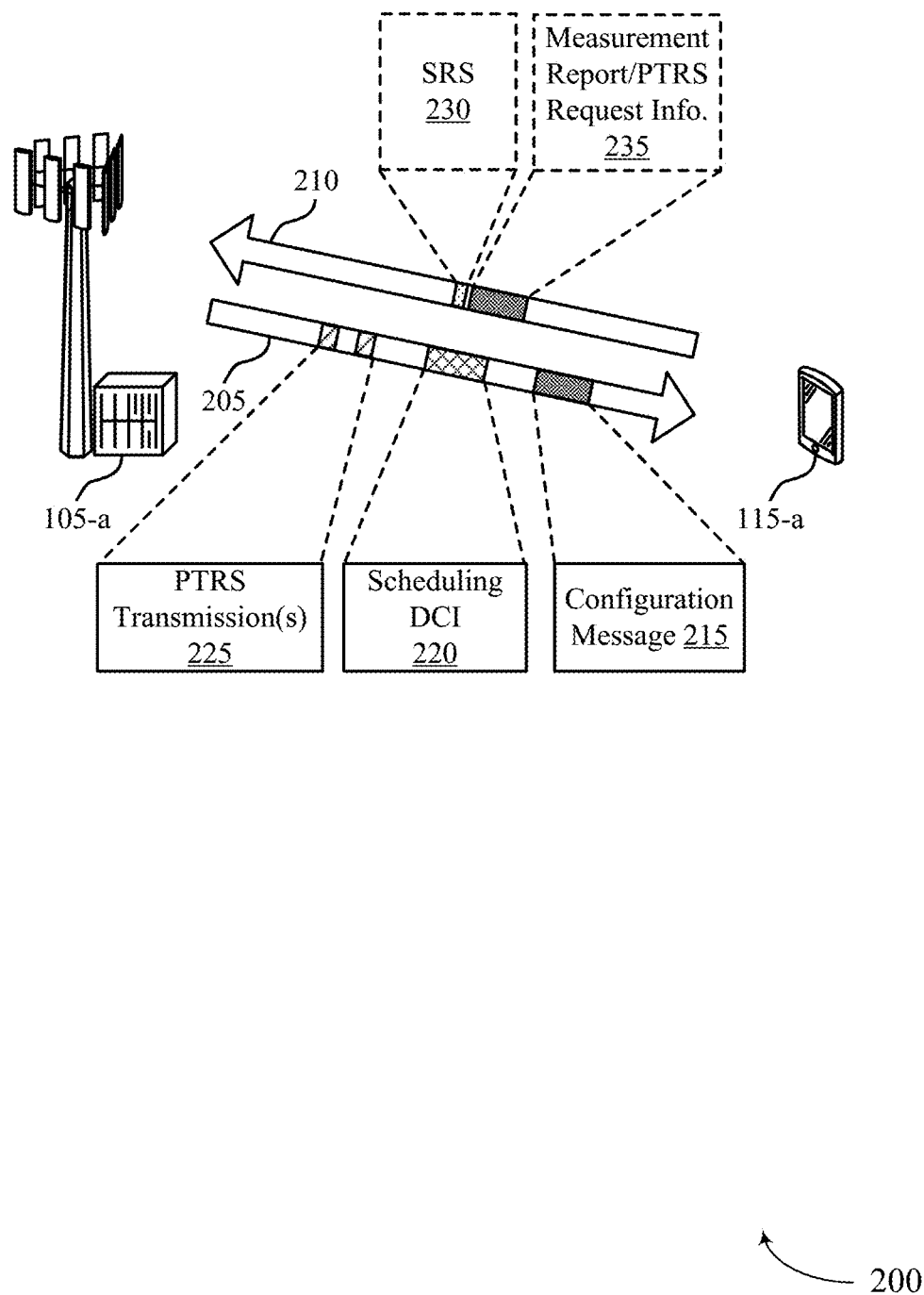

FIG. 2 illustrates an example of a wireless communications system 200 that supports frequency selective PTRS allocation. In some examples, the wireless communications system 200 may implement aspects of wireless communications system 100. The wireless communications system 200 includes BS 105-a and a UE 115-a, which may be examples of the corresponding devices described with reference to FIG. 1.

The BS 105-a and UE 115-a may communicate via a downlink communication link 205 and an uplink communication link 210. In some implementations, the BS 105-a may configure UE 115-a for communications, with at least a portion of the configuration provided by configuration message 215. The configuration message 215 may provide information related to a set of frequency resources that are configured for communications, such as a number of frequency sub-bands that are configured in one or more carriers used in downlink communication link 205 and uplink communication link 210. In some implementations, the BS 105-a may configure multiple component carriers that carry communications between the UE 115-a and BS 105-a.

In some implementations, the configuration message 215 also may provide an indication of PTRS parameters that are configured for the set of frequency resources. For example, the configuration message 215 may provide time and frequency densities for PTRS transmissions 225 across the set of frequency resources. Time densities may be indicated, in some implementations, as a PTRS transmission 225 per a number of PDSCH symbols (for example, based on a parameter L that indicates one PTRS on each PDSCH symbol, one PTRS per every two PDSCH symbols, or one PTRS per every four PDSCH symbols). Frequency densities may be indicated, in some implementations, as a number of PTRS tones per resource block (RB) (for example, based on a parameter K that indicates a number of PTRS tones per RB). In some implementations, the configuration message 215 may include a threshold value of RBs for activating the PTRS resource indications provided by the scheduling DCI 220 (for example, if a number of configured RBs for communications is less than the threshold value, PTRS transmissions 225 are provided across all of the RBs, and if the number of configured RBs is at least the threshold value, the scheduling DCI 220 may provide an indication of the subset of frequency resources that include the PTRS transmissions 225).

As described herein, in some implementations, a subset of frequency resources from the set of frequency resources may be selected for PTRS transmissions 225. In some implementations, the subset of frequency resources may be selected at the BS 105-a based on channel conditions associated with each of a number of different subsets of frequency resources. The channel conditions may be determined based on one or more reference signal measurements at the BS 105-a, at the UE 115-a, or any combinations thereof. Measurements made at the UE 115-a may include channel measurements of a CSI-RS, for example, that are reported to the BS 105-a in a measurement report 235, which in some cases may be transmitted along with PTRS request information. The PTRS request information may include, for example, a requested PTRS time density, a requested PTRS frequency density, a requested subset of frequency resources for PTRS transmission 225, or any combinations thereof. Measurements made at the BS 105-a may include channel measurements of a SRS 230 that is transmitted by the UE 115-a. Additionally, or alternatively, the BS 105-a may select the subset of frequency resources based at least in part on resource allocations to different UEs, which may allow the BS 105-a to estimate an amount of interference that is likely at different subsets of frequency resources (for example, an estimate of interference at different tones of groups of tones within the set of frequency resources).

In some implementations, the BS 105-a may signal the selected subset of frequency resources in a scheduling DCI 220 that is transmitted to the UE 115-a. The selected subset of frequency resources may be determined, for example, as a frequency sub-band having a highest measured channel gain, a frequency sub-band with a lowest measured interference, a RE interlace with the lowest measured interference, or any combinations thereof. In some implementations, the configuration message 215 may provide information related to multiple PTRS patterns, multiple PTRS locations, or combinations thereof, within the configured set of frequency resources of a frequency domain resource allocation, and the scheduling DCI 220 may provide an indication of which pattern, location, or combinations thereof, has been selected. In some implementations, the scheduling DCI 220 may include a bit field that is used to signal the selected subset of frequency resources which is based on the pattern, location, or both. For example, the scheduling DCI 220 may provide an index value to a table of different combinations of patterns, locations, and frequency sub-bands, that are available for PTRS transmissions 225. Such a table may be configured, in some implementation, by RRC signaling, or by a MAC-CE, for example. In some implementations, the set of patterns and locations for PTRS transmissions 225 may depend on RB allocation, a modulation and coding scheme (MCS), one or more other communications parameters for downlink communication (such as a frequency band), or any combinations thereof.

Figure 4:
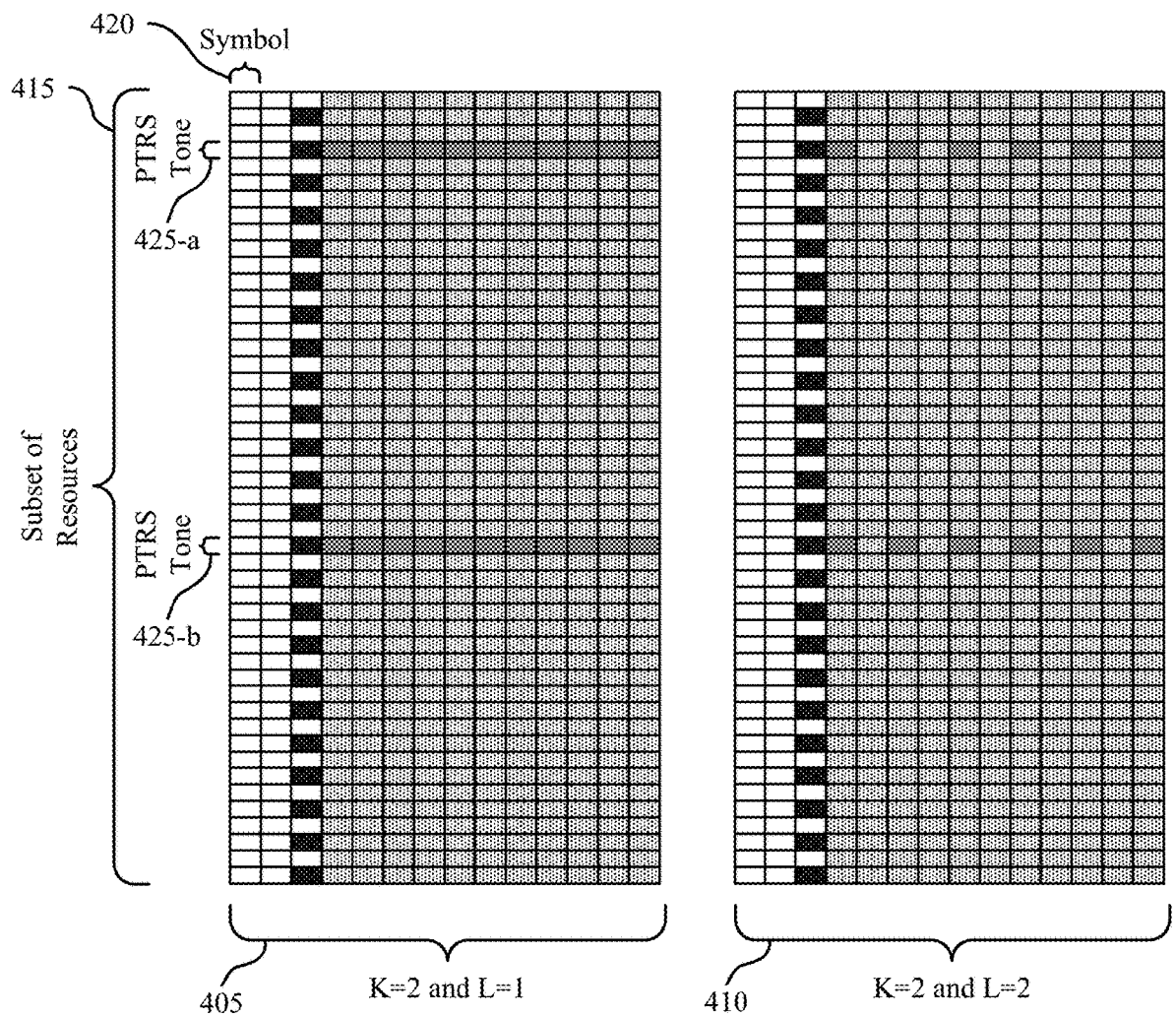
FIGS. 4 and 5 show examples of PTRS resource configurations that support frequency selective PTRS allocation.
Figure 5:
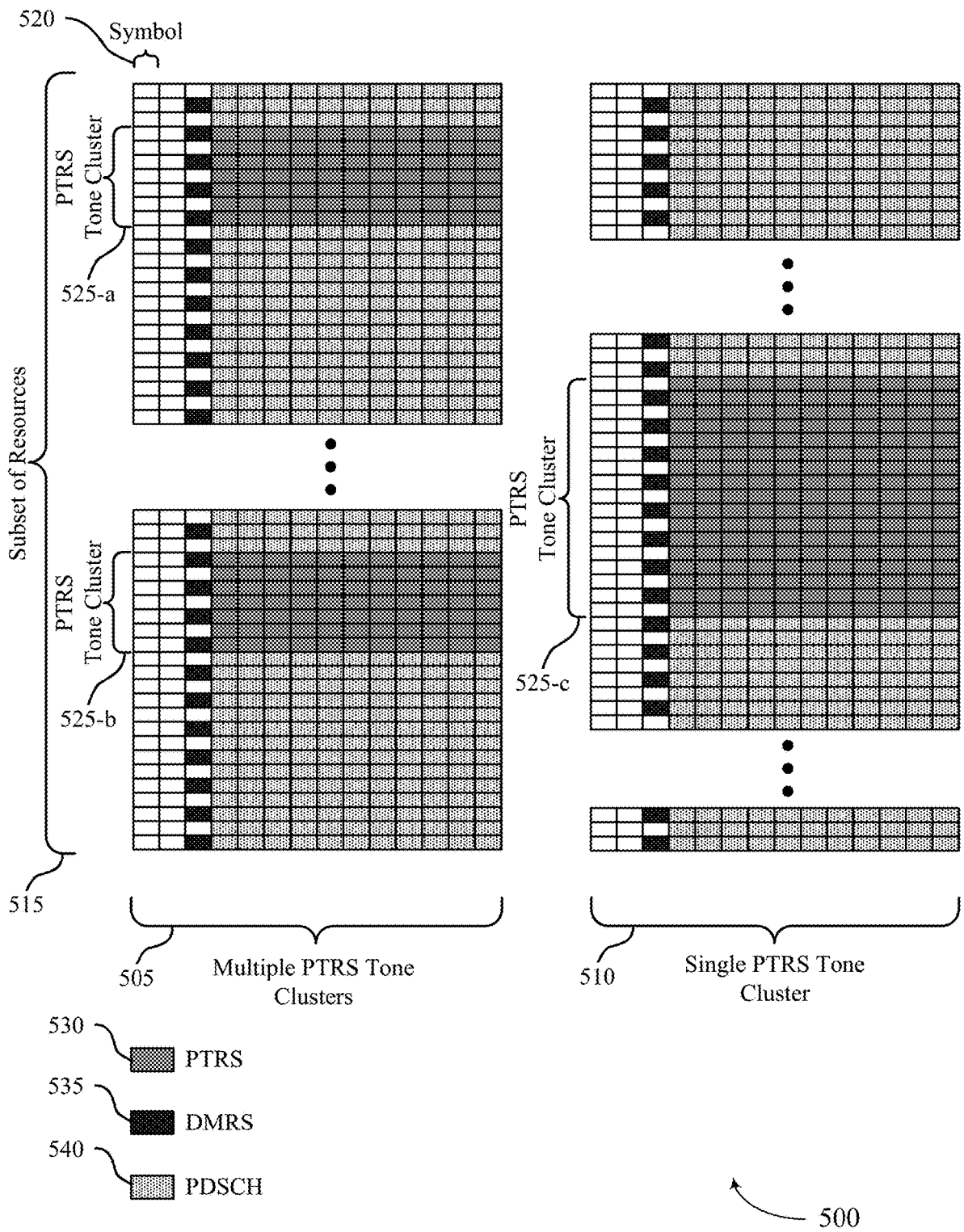

For example, the configuration message 215 may provide an indication of a total RB allocation that is provided for PDSCH communications with the UE 115-b. The total RB allocation may be divided into, for example, four chunks or resource partitions, and the PTRS transmissions 225 are to be sent over a particular chunk or resource partition that has acceptable channel conditions. In such implementations, the scheduling DCI 220 may include an index value (such as a two bit indication) of the selected chunk or resource partition. Additionally, in some implementations, the scheduling DCI 220 may provide an offset that may be selected from a number of different preconfigured offsets, which may be selected to provide that the PTRS transmissions 225 have the best channel with the selected chunk. The index of the offset also may be provided in the scheduling DCI 220, in some implementations. Different patterns of PTRS transmissions 225 may be sent uniformly within the selected subset of frequency resources such as illustrated in the examples of FIG. 4, or as clustered transmissions such as illustrated in the examples of FIG. 5.

In some implementations, the UE 115-a may transmit a measurement report 235 that also indicates one or more PTRS requests. Such PTRS requests may be made based on CSI-RS measurements at the UE 115-a, for example, and may include a requested subset of frequency resources, a requested time density, a requested frequency density, a requested cluster configuration, or any combinations thereof, for PTRS transmissions 225. The BS 105-a, in such implementations, may select the subset of frequency resources for PTRS transmissions 225, along with time density and frequency density, based on the UE 115-a request. In some implementations, the number of transmitted PTRS tones may be selected in order to maintain a total number of tones as the case where PTRS transmissions 225 are sent according to the frequency density parameter (for example, the frequency density parameter K) over the set of frequency resources. In some other implementations, the number of transmitted PTRS tones may be selected as the requested number of tones from the UE 115-a. In yet some other implementations, the number of transmitted PTRS tones may use a frequency density on the selected subset of frequency resources (for example, the chosen chunk(s)), and the BS 105-a may boost the power of the sent PTRS tones to match the total power that would be present if the PTRS transmissions 225 were sent over the set of frequency resources rather than just the subset of frequency resources. Such power boosting may further enhance the PTRS channel quality at the UE 115-a and thus may further enhance the phase noise compensation at the UE 115-a.

Additionally, or alternatively, in some implementation the TBS of a communication (for example, a PDSCH TBS) may be adjusted or scaled based on the actual PTRS overhead of the PTRS transmissions 225. In such implementations, an overhead value may be used for TBS calculation that assumes a certain density of PTRS tones across the set of frequency resources. The actual number of PTRS tones that will are transmitted, however, may be based on the subset of frequency resources, and the adjustment or scaling of the TBS may be based on the difference in the number of PTRS tones assumed in the overhead value and the actual number of transmitted PTRS tones. In some implementations, the BS 105-a may use a different overhead value for the TBS calculation than a RRC configured value, and this different overhead value also may be signaled to the UE 115-a in the scheduling DCI 220.

Additionally, or alternatively, in some implementations the BS 105-a may activate or deactivate the PTRS transmissions 225 using only a subset of frequency resources. For example, it may be determined that channel conditions across the set of frequency resources are relatively uniform such that PTRS transmissions 225 using only a subset of frequency resources will not substantially enhance phase noise compensation, and adaptive PTRS allocation for only the subset of frequency resources may be deactivated. Similarly, if it is determined that transmission of PTRS using the subset of frequency resources is likely to enhance phase noise compensation, the adaptive PTRS allocation for only the subset of frequency resources may be activated. In some implementations, the activation or deactivation may be indicated through RRC signaling, a MAC-CE, or any combinations thereof.

In some implementations, based on the estimated channel that is used for PTRS transmissions 225, the BS 105-a may allocate a different transmission power for different REs that contain PTRS. For example, based on the actually transmitted PTRS tones, the BS 105-a may determine a transmission power of the PTRS tones so that the total capacity of the PTRS tones are enhanced, and a first number of PTRS tones within the subset of frequency resources are power boosted to provide an aggregate power level that matches a total power associated with a total number of PTRS tones that span the set of frequency resources. In some implementations, the BS 105-a may select a PTRS pattern that includes one or more zero power tones based on the estimated channel condition (for example, the PTRS pattern is selected from a set of pre-defined patterns, and an index of the pattern is signaled to the UE 115-a via scheduling DCI 220).

Figure 3:
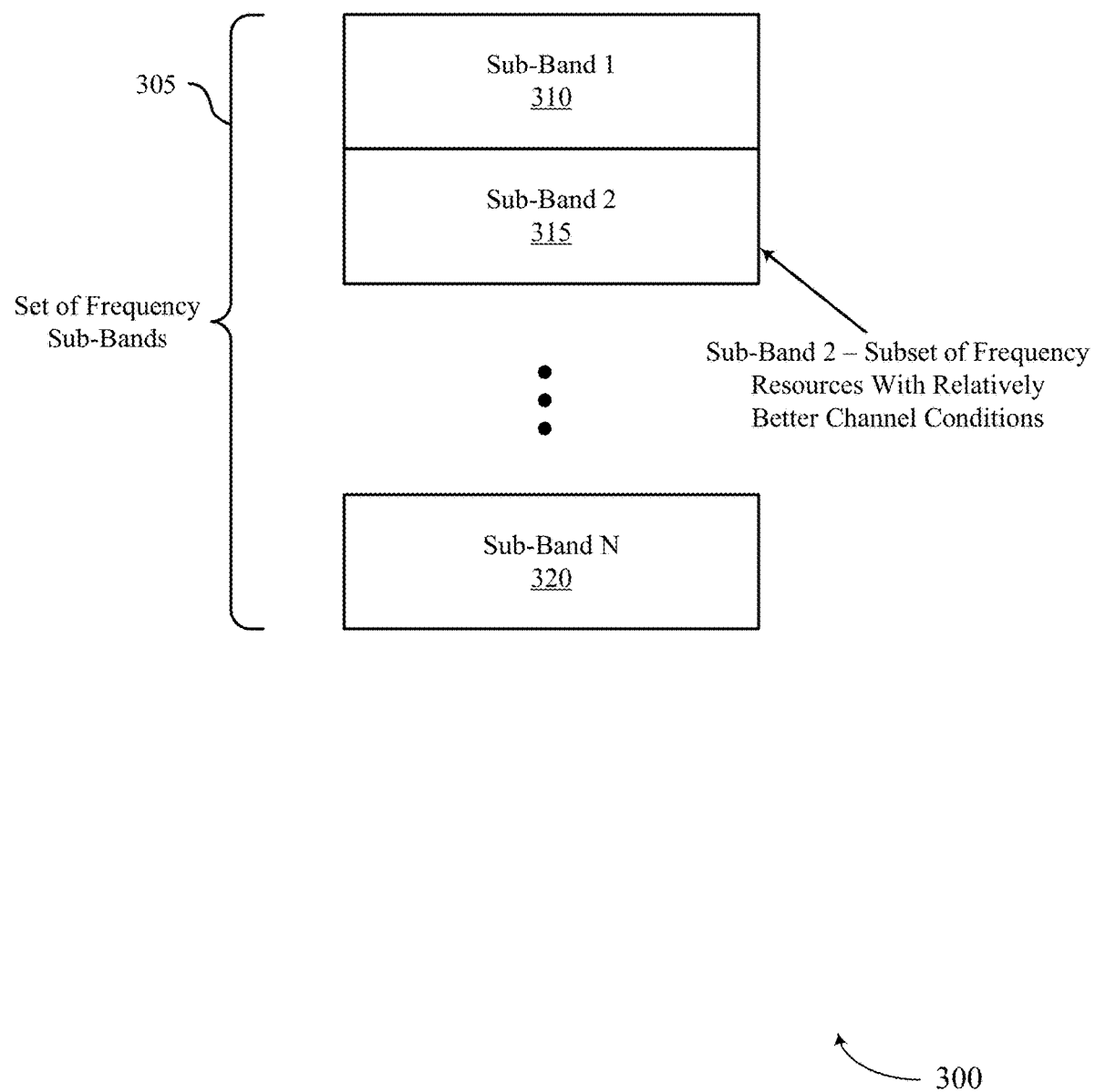
FIG. 3 shows an example set of frequency resources that supports frequency selective PTRS allocation.

FIG. 3 shows an example set of frequency resources 300 that supports frequency selective PTRS allocation. In some examples, set of frequency resources 300 may implement aspects of wireless communications system 100 or 200 depicted and described in FIGS. 1 and 2. In the example of FIG. 3, the set of frequency resources 300 may include a set of frequency sub-bands 305. The set of frequency sub-bands 305 may include, for example, sub-bands of a set of mmW frequency resources that are allocated for communications between a UE and a BS.

In some implementations, the set of frequency sub-bands 305 may include a first sub-band 310, a second sub-band 315, through an Nth sub-band 320. As discussed herein, one or more of the frequency sub-bands 305 may have more or less favorable channel conditions for PTRS transmissions, and PTRS transmission may be enhanced by providing PTRS transmissions in a subset of the frequency sub-bands 305 that have more favorable channel conditions. Such a determination may be made, for example, based on one or more channel measurements of reference signals that are transmitted and that span the set of frequency sub-bands 305. In the example of FIG. 3, the second sub-band 310 may be identified as a subset of frequency resources with relatively better channel conditions. Thus, in this example, the second sub-band 310 may be selected for PTRS transmissions, and PTRS transmissions that would otherwise be transmitted using other of the set of frequency sub-bands 305 may be canceled.

FIG. 4 shows two examples of PTRS resource configurations 400 that support frequency selective PTRS allocation. In some examples, PTRS resource configurations 400 may implement aspects of wireless communications system 100 or 200 as described herein. As discussed with reference to FIG. 2, in some implementations a PTRS configuration may be provided that indicates a time density of PTRS, a frequency density of PTRS, or combinations thereof.

In the examples of FIG. 4, PTRS configurations may include a parameter for time density, L, and a parameter for frequency density, K. In some implementations, a defined number of available values for L may include L=1 that indicates PTRS is transmitted in each symbol 420 that includes PDSCH 440, L=2 that indicates PTRS is transmitted on one symbol 420 of every two PDSCH 440 symbols, or L=4 that indicates PTRS is transmitted on one symbol 420 of every four PDSCH 440 symbols. Further a defined number of available values for K may include K=4 that indicates one PTRS tone 425 is sent every four RBs, or K=2 that indicates one PTRS tone 425 is sent every two RBs.

In a first example 405 of FIG. 4, a PTRS configuration with K=2 and L=1 is provided, which results in a subset of resources 415 that includes a first PTRS tone 425-a and a second PTRS tone 425-b that include PTRS 430 transmissions in each symbol 420 that has PDSCH 440 REs. The subset of resources 415 also include demodulation reference signal (DMRS) 435 resources, and PDSCH 440 resources. In a second example 410, a PTRS configuration with K=2 and L=2 is provided, which results in a subset of resources 415 that includes a first PTRS tone 425-a and a second PTRS tone 425-b that include PTRS 430 transmissions in every second symbol 420 that has PDSCH 440 REs. In some implementations, the PTRS configurations may be configured in a configuration message and may repeat across all subsets of frequency resources of a set of frequency resources. In accordance with techniques as discussed herein, the subset of resources 415 may be indicated to the UE, and the PTRS configuration within the subset of resources 415 may be used to transmit PTRS 430 by a base station and to monitor for PTRS 430 by the UE. Numerous other examples of PTRS configurations may be present, and the examples of FIG. 4 are provided for purposes of discussion and illustration only, and other examples of PTRS configurations for a subset of frequency resources are within the scope of the present disclosure.

FIG. 5 shows two further examples of PTRS resource configurations 500 that support frequency selective PTRS allocation. In some examples, PTRS resource configurations 500 may implement aspects of wireless communications system 100 or 200 as described herein. As discussed with reference to FIG. 2, in some implementations a PTRS configuration may be provided that indicates PTRS tone clusters within a subset of frequency resources 515. In the examples of FIG. 5, PRTS 530 transmissions may occur in each tone and each symbol 520 of a PTRS tone cluster 525 that has PDSCH 540 resources.

In a first example 505, multiple PTRS tone clusters 525 may be present in a subset of frequency resources 515. In this example, a first PTRS tone cluster 525-a and a second PTRS tone cluster 525-b may be defined within the subset of frequency resources 515. In a second example 510, a single PTRS tone cluster 525-c may be defined within the subset of frequency resources 515. The subset of frequency resources 515 also include demodulation reference signal (DMRS) 535 resources. In some implementations, the PTRS configurations may be configured in a configuration message and may repeat across all subsets of frequency resources 515 of a set of frequency resources. In accordance with techniques as discussed herein, the subset of frequency resources 515 may be indicated to the UE, and the PTRS configuration within the subset of frequency resources 515 may be used to transmit PTRS 530 by a base station and to monitor for PTRS 530 by the UE. Numerous other examples of PTRS tone cluster configurations may be present, and the examples of FIG. 5 are provided for purposes of discussion and illustration only, and other examples of PTRS configurations for a subset of frequency resources are within the scope of the present disclosure.

Figure 6:
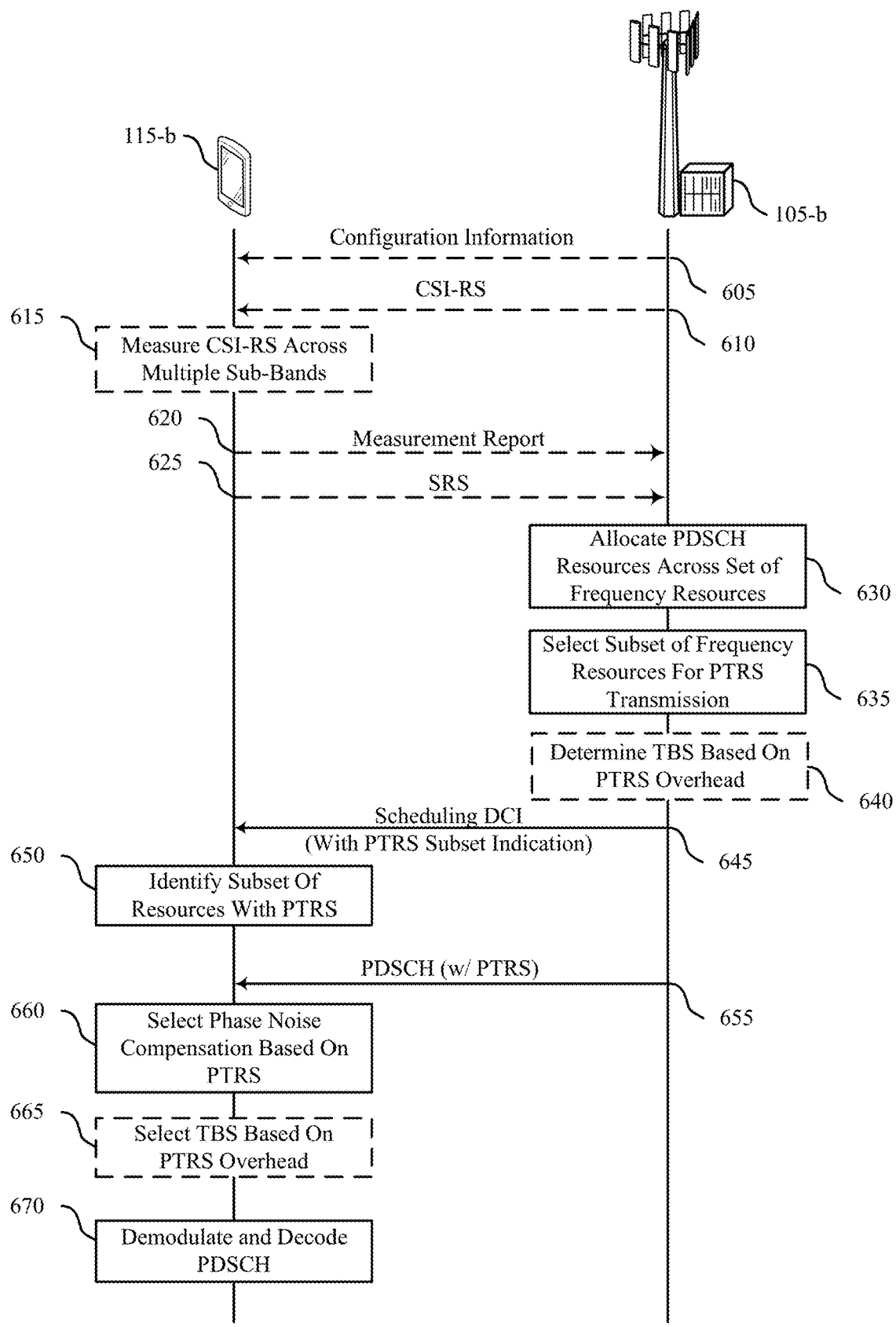
FIG. 6 shows an example process flow that supports frequency selective PTRS allocation.

FIG. 6 shows an example process flow 600 that supports frequency selective PTRS allocation. In some implementations, the process flow 600 may be implemented by or may implement aspects of the wireless communications systems 100 or 200. In one aspect, the process flow 600 may include example operations associated with a UEs 115-b and a BS 105-b. In the following description of the process flow 600, the operations between the UE 115-b and the BS 105-b may be performed in a different order than the example order shown, or the operations performed by the UE 115-b and the BS 105-b may be performed in different orders or at different times. Some operations also may be omitted from the process flow 600, and other operations may be added to the process flow 600.

In some implementations, at 605, the BS 105-b optionally may transmit configuration information to the UE 115-b. The configuration information may include, for example, a set of frequency resources that are configured for communications between the UE 115-b and the BS 105-b. The configuration information also may include information related to a number of available PTRS patterns, locations, or combinations thereof, that may be selected for PTRS transmissions. Additionally, or alternatively, the configuration information may include an activation or deactivation indication, that activates or deactivates adaptive PTRS transmissions using a subset of frequency resources as described herein. The configuration information may be provided in RRC signaling, in a MAC-CE, in other downlink signaling, or any combinations thereof.

In some implementations, at 610, the BS 105-b may transmit a CSI-RS to the UE 115-b. At 615, in some implementations in which the BS 105-b transmits CSI-RS, the UE 115-b may measure the CSI-RS across multiple sub-bands. In some implementations, the multiple sub-bands may correspond to a set of frequency resources that are configured for communications between the UE 115-b and the BS 105-b. In some implementations, at 620, the UE 115-b may transmit a measurement report to the BS 105-b. The measurement report may include channel measurements based on the CSI-RS across the multiple sub-bands, and may be used to select a particular sub-band that has more favorable channel conditions than other of the multiple sub-bands. Additionally, or alternatively, at 625, the UE 115-b may transmit a SRS across the multiple sub-bands. In some implementations, the BS 105-b may measure the SRS from the UE 115-b and determine channel conditions for the different sub-bands.

At 630, the BS 105-b may allocate PDSCH resources across the set of frequency resources. At 635, the BS 105-b select a subset of frequency resources that are to be used for PTRS transmissions. In some implementations, the selection of the subset of frequency resources may be based on channel measurements made at the BS 105-b based on the SRS, based on a received measurement report from the UE 115-b, scheduling parameters for one or more other UEs that are served by the BS 105-b, or any combinations thereof. In some implementations, at 640, the BS 105-*b* select a TBS of the PDSCH based on a signaled overhead value and the subset of frequency resources for PTRS transmission.

At 645, the BS 105-*b* may transmit a scheduling DCI to the UE 115-*b*. The scheduling DCI may include an indication of a subset of resources that are to include PTRS transmissions. In some implementations, the subset of resources may be indicted in a bit field within the scheduling DCI that provides an index value to a set of preconfigured PTRS patterns or locations, or both.

At 650, the UE 115-*b* may identify the subset of resources that include PTRS transmissions. In some implementations, the UE 115-*b* may identify the subset of resources based on the index value provided in the scheduling DCI. At 650, the BS 105-*b* may transmit the PDSCH. The PDSCH may be transmitted using the set of frequency resources, and may include PTRS transmission that are located in the subset of frequency resources according to the indication provided in the scheduling DCI.

At 660, the UE 115-*b* may select a phase noise compensation based on the PTRS transmission in the subset of frequency resources. In some implementations, the UE 115-*b* may select a TBS for the PDSCH based on PTRS overhead, and the actual PTRS transmissions in the subset of frequency resources. At 670, the UE 115-*b* may demodulate and decode the PDSCH based on the selected phase noise compensation.

Figure 7:
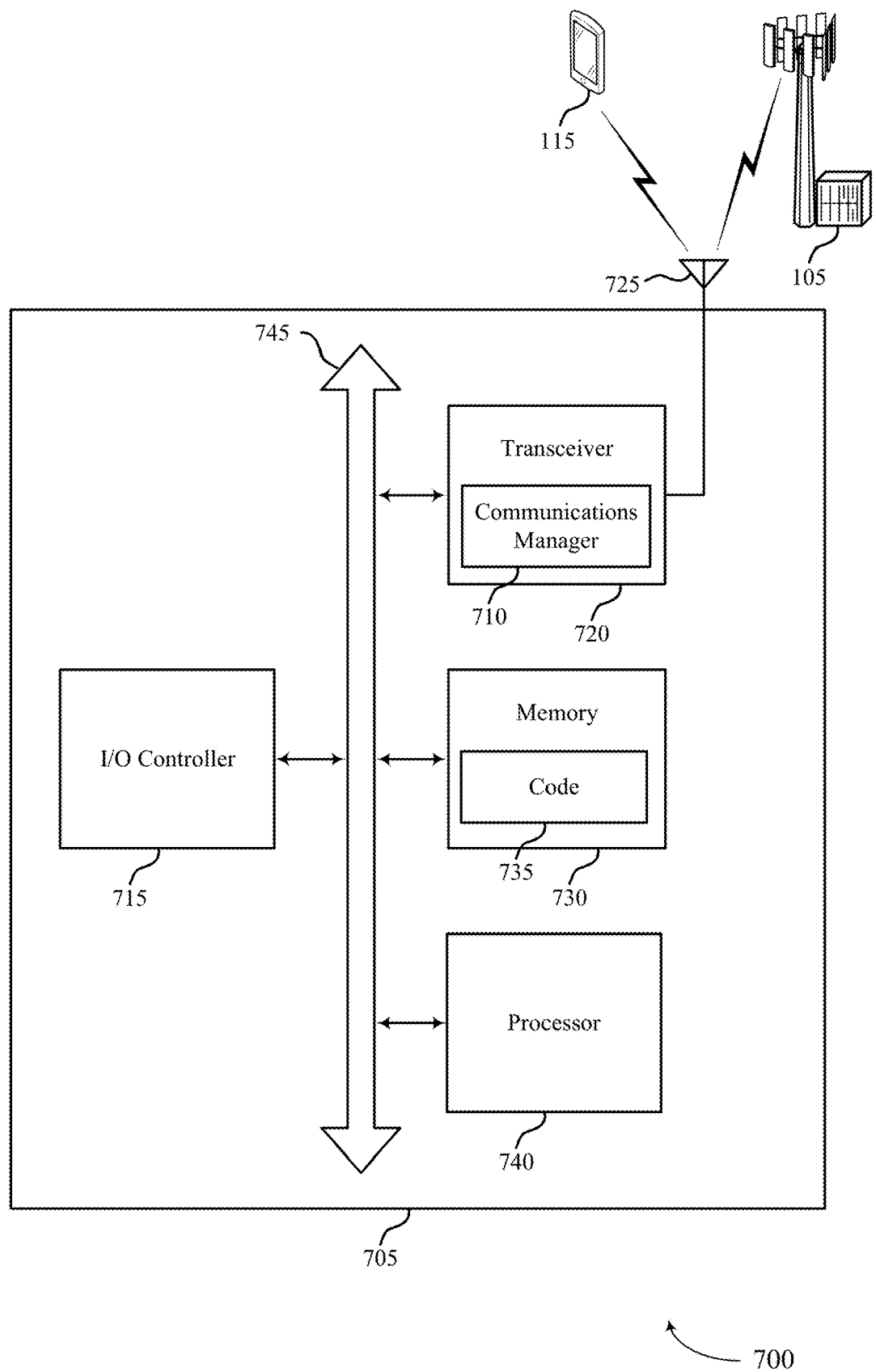
FIGS. 7 and 8 show example systems including example devices that support frequency selective PTRS allocation.

FIG. 7 shows a diagram of a system 700 including an example device 705 that supports frequency selective PTRS allocation. The device 705 may be an example of or include the components of a UE 115 as described herein. The device 705 may include components for bi-directional voice and data communications including components for transmitting and receiving communications, including a communications manager 710, an input/output (I/O) controller 715, a transceiver 720, an antenna 725, memory 730, and a processor 740. These components may be in electronic communication via one or more buses (for example, bus 745).

The communications manager 710 may identify a set of frequency resources configured for PTRS transmissions. The communications manager 710 may receive, from a BS, control information indicating a first PTRS associated with a first communication is transmitted using a subset of frequency resources from the set of frequency resources, where the first communication spans the set of frequency resources. The communications manager 710 may select a phase noise compensation for the first communication based on the first PTRS.

In some implementations, the communications manager 710, when functioning as a processor or a processing system, may obtain signaling from a receiver, such as the transceiver 720, using a first interface and may output signaling for transmission via a transmitter, such as the transceiver 720, using the first interface or a second interface.

The I/O controller 715 may manage input and output signals for the device 705. The I/O controller 715 also may manage peripherals not integrated into the device 705. In some implementations, the I/O controller 715 may represent a physical connection or port to an external peripheral. In some implementations, the I/O controller 715 may utilize an operating system such as iOS®, ANDROID®, MS-DOS®, MS-WINDOWS®, OS/2®, UNIX®, LINUX®, or another known operating system. In some other examples, the I/O controller 715 may represent or interact with a modem, a keyboard, a mouse, a touchscreen, or a similar device. In some implementations, the I/O controller 715 may be implemented as part of a processor. In some implementations, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas.

In some implementations, the wireless device may include a single antenna 725. However, in some implementations the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some implementations, the memory 730 may contain, among other things, a basic I/O system (BIOS) which may control basic hardware or software operation such as the interaction with peripheral components or devices.

The processor 740 may include a hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 740 may be configured to operate a memory array using a memory controller. In some other examples, a memory controller may be integrated into the processor 740. The processor 740 may be configured to execute computer-readable instructions stored in a memory (for example, the memory 730) to cause the device 705 to perform various functions (for example, functions or tasks supporting slot identification for SPS and configured grant transmissions).

The processor 740 may be any one or more suitable processors capable of executing scripts or instructions of one or more software programs stored in the device 705 (such as within the memory 730). For example, the processor 740 may execute the communications manager 710 or the I/O controller 715.

In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705.

The processing system of the device 705 may interface with other components of the device 705, and may process information received from other components (such as inputs or signals), output information to other components, etc. For example, a chip or modem of the device 705 may include a processing system, a first interface to output information transmission, and a second interface to obtain information received over a wireless channel. In some cases, the first interface may refer to an interface between the processing system of the chip or modem and a transmitter, such that the device 705 may transmit information output from the chip or modem. In some cases, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The code 735 may include instructions to implement aspects of the present disclosure, including instructions to support wireless communications. The code 735 may be stored in a non-transitory computer-readable medium such as system memory or other type of memory. In some implementations, the code 735 may not be directly executable by the processor 740 but may cause a computer (for example, when compiled and executed) to perform functions described herein.

In some implementations, the communications manager 710 may be implemented as an integrated circuit or chipset for a mobile device modem, and a receiver and a transmitter may be implemented as analog components (for example, amplifiers, filters, antennas) coupled with the mobile device modem to enable wireless transmission and reception over one or more bands.

Figure 8:
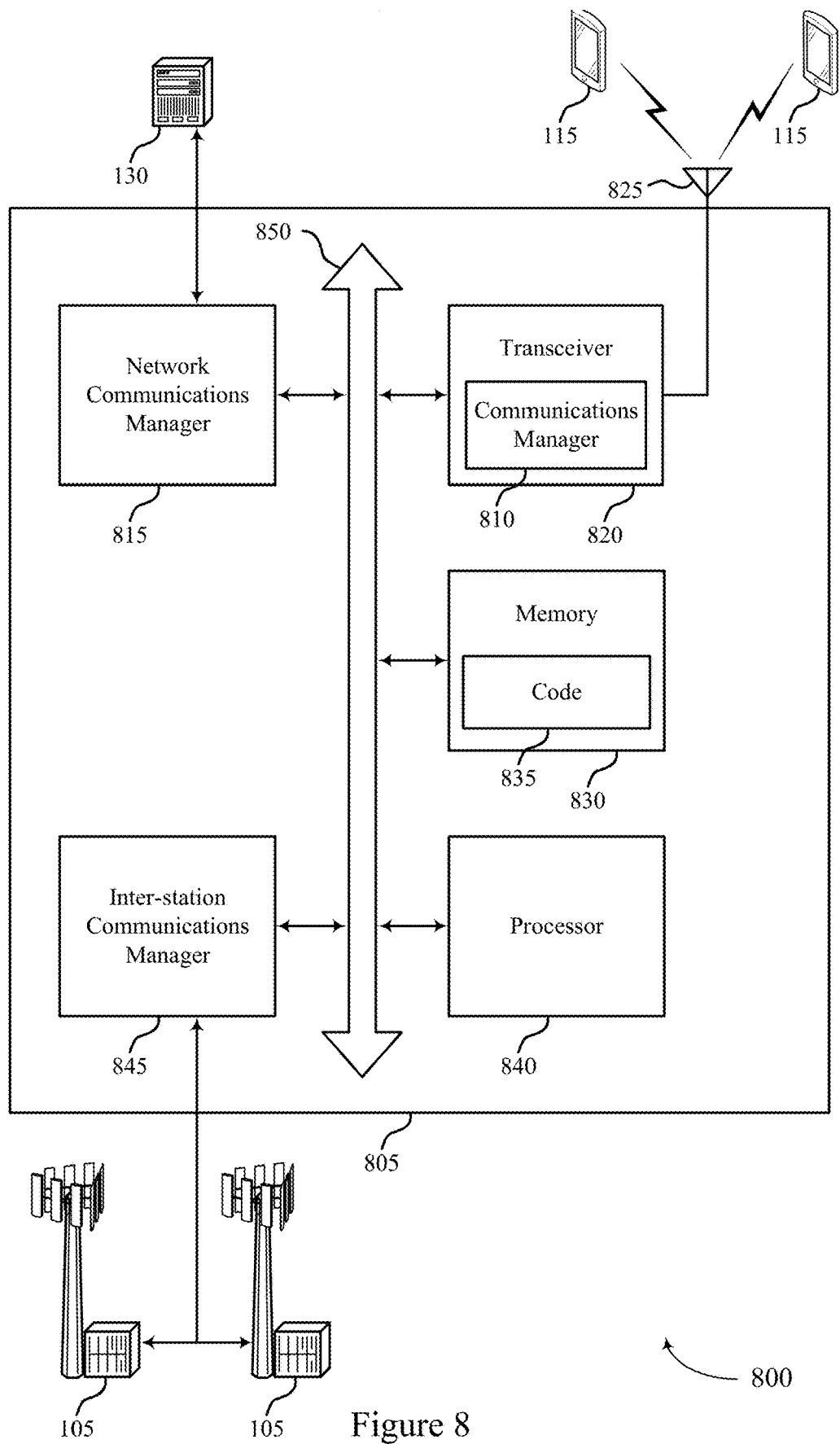

FIG. 8 shows a diagram of a system 800 including an example device 805 that supports frequency selective PTRS allocation. The device 805 may be an example of or include the components of a BS 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (for example, bus 850).

The communications manager 810 may identify a set of frequency resources available for a PTRS transmission to a UE. The communications manager 810 transmit, to the UE, control information indicating a subset of frequency resources from the set of frequency resources includes a first PTRS for a first communication between the BS and the UE, where the first communication spans the set of frequency resources. The communications manager 810 and transmit, to the UE, the first communication and the first PTRS, where the first PTRS is transmitted in the subset of frequency resources.

In some implementations, the communications manager 810, when functioning as a processor or a processing system, may obtain the signaling from a receiver, such as the transceiver 820, using a first interface or a second interface, and may output signaling for transmission via a transmitter, such as the transceiver 820, using the first interface or the second interface.

The network communications manager 815 may manage communications with the core network (for example, via one or more wired backhaul links). For example, the network communications manager 815 may manage the transfer of data communications for client devices, such as one or more UEs 115.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 also may include a modem to modulate the packets and provide the modulated packets to the antennas for transmission, and to demodulate packets received from the antennas.

In some implementations, the wireless device may include a single antenna 825. However, in some implementations the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (for example, the processor 840) cause the device to perform various functions described herein. In some implementations, the memory 830 may contain, among other things, a BIOS which may control basic hardware or software operation such as the interaction with peripheral components or devices.

The processor 840 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 840 may be configured to operate a memory array using a memory controller. In some implementations, a memory controller may be integrated into processor 840. The processor 840 may be configured to execute computer-readable instructions stored in a memory (for example, the memory 830) to cause the device 805 to perform various functions (for example, functions or tasks supporting slot identification for SPS and configured grant transmissions).

The inter-station communications manager 845 may manage communications with other BSs 105, and may include a controller or scheduler for controlling communications with UEs 115 in cooperation with other BSs 105. For example, the inter-station communications manager 845 may coordinate scheduling for transmissions to UEs 115 for various interference mitigation techniques such as beamforming or joint transmission. In some implementations, the inter-station communications manager 845 may provide an X2 interface within an LTE/LTE-A wireless communication network technology to provide communication between BSs 105.

The code 835 may include instructions to implement aspects of the present disclosure, including instructions to support wireless communications. The code 835 may be stored in a non-transitory computer-readable medium such as system memory or other type of memory. In some implementations, the code 835 may not be directly executable by the processor 840 but may cause a computer (for example, when compiled and executed) to perform functions described herein.

Figure 9:
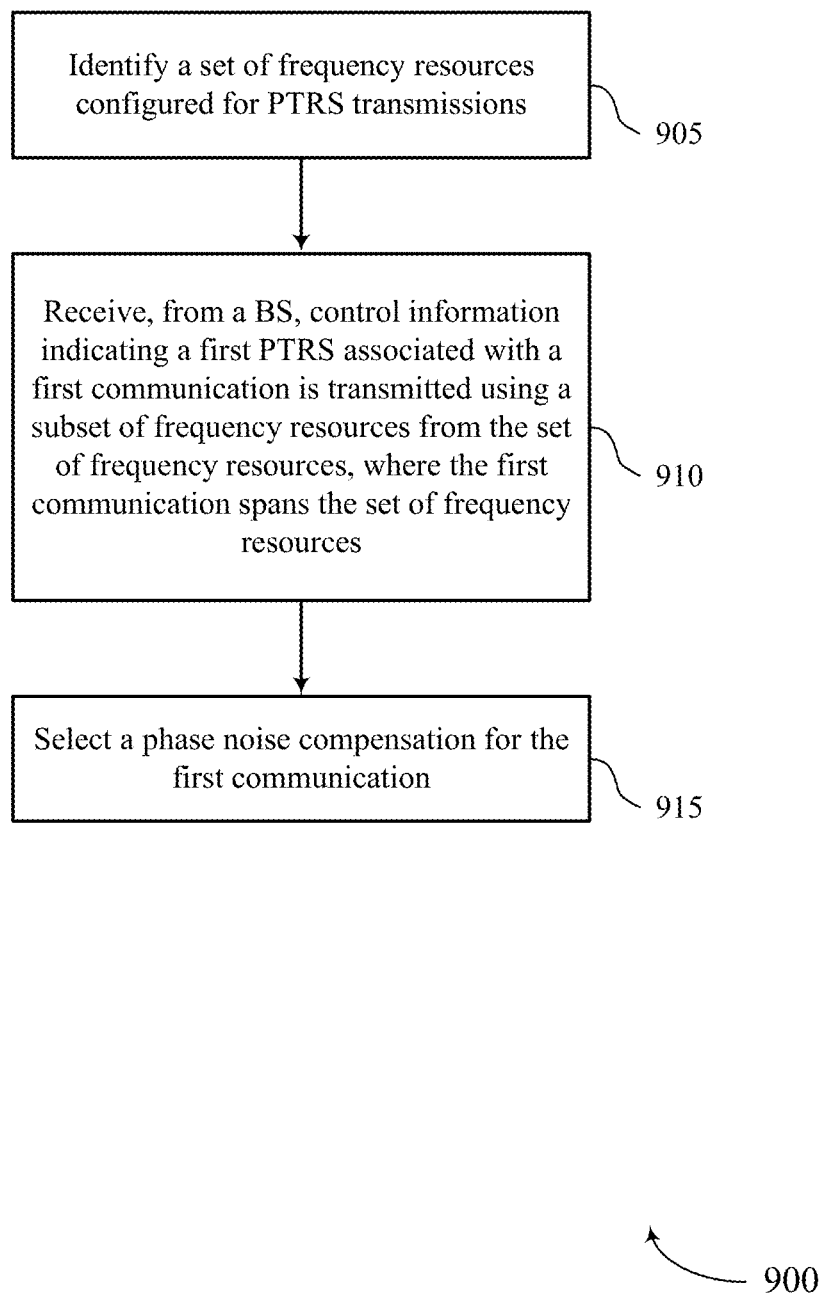
FIGS. 9 through 13 show flowcharts illustrating example methods that support frequency selective PTRS allocation.

FIG. 9 shows a flowchart illustrating a method 900 that supports frequency selective PTRS allocation. The operations of method 900 may be implemented by a UE 115 or its components as described herein. For example, the operations of method 900 may be performed by a communications manager as described with reference to FIG. 7. In some examples, a UE may execute a set of instructions to control the functional elements of the UE to perform the functions described below. Additionally or alternatively, a UE may perform aspects of the functions described below using special-purpose hardware.

At 905, the UE may identify a set of frequency resources configured for PTRS transmissions. The operations of 905 may be performed according to the methods described herein.

At 910, the UE may receive, from a base station (BS), control information indicating a first PTRS associated with a first communication is transmitted using a subset of frequency resources from the set of frequency resources, where the first communication spans the set of frequency resources. The operations of 910 may be performed according to the methods described herein.

At 915, the UE may select a phase noise compensation for the first communication. The operations of 915 may be performed according to the methods described herein.

Figure 10:
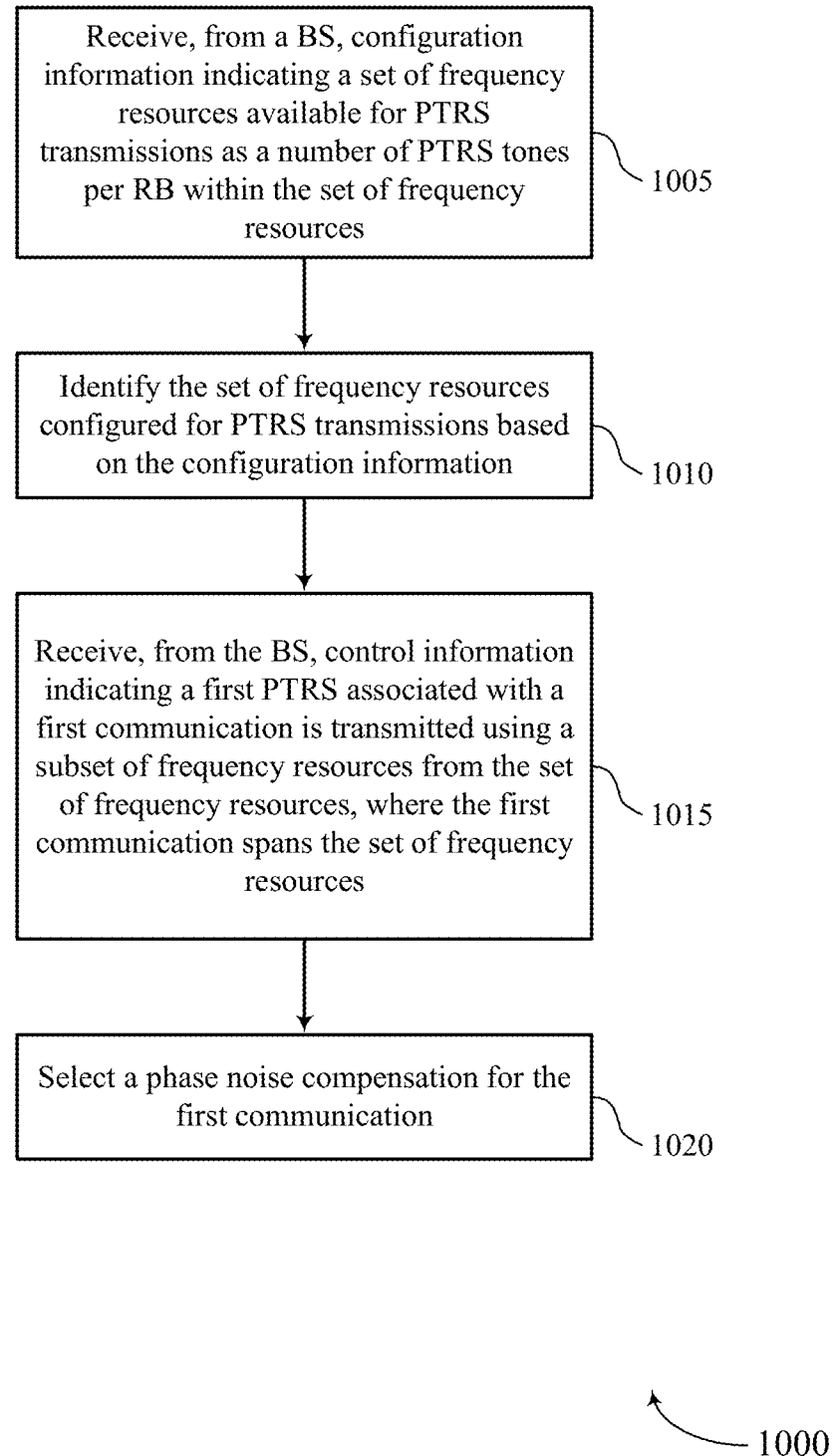

FIG. 10 shows a flowchart illustrating a method 1000 that supports frequency selective PTRS allocation. The operations of method 1000 may be implemented by a UE 115 or its components as described herein. For example, the operations of method 1000 may be performed by a communications manager as described with reference to FIG. 7. In some examples, a UE may execute a set of instructions to control the functional elements of the UE to perform the functions described below. Additionally or alternatively, a UE may perform aspects of the functions described below using special-purpose hardware.

At 1005, the UE may receive, from a BS, configuration information indicating a set of frequency resources available for PTRS transmissions as a number of PTRS tones per RB within the set of frequency resources. The operations of 1005 may be performed according to the methods described herein.

At 1010, the UE may identify the set of frequency resources configured for PTRS transmissions based on the configuration information. The operations of 1010 may be performed according to the methods described herein.

At 1015, the UE may receive, from the BS, control information indicating a first PTRS associated with a first communication is transmitted using a subset of frequency resources from the set of frequency resources, where the first communication spans the set of frequency resources. The operations of 1015 may be performed according to the methods described herein.

At 1020, the UE may select a phase noise compensation for the first communication. The operations of 1020 may be performed according to the methods described herein.

Figure 11:
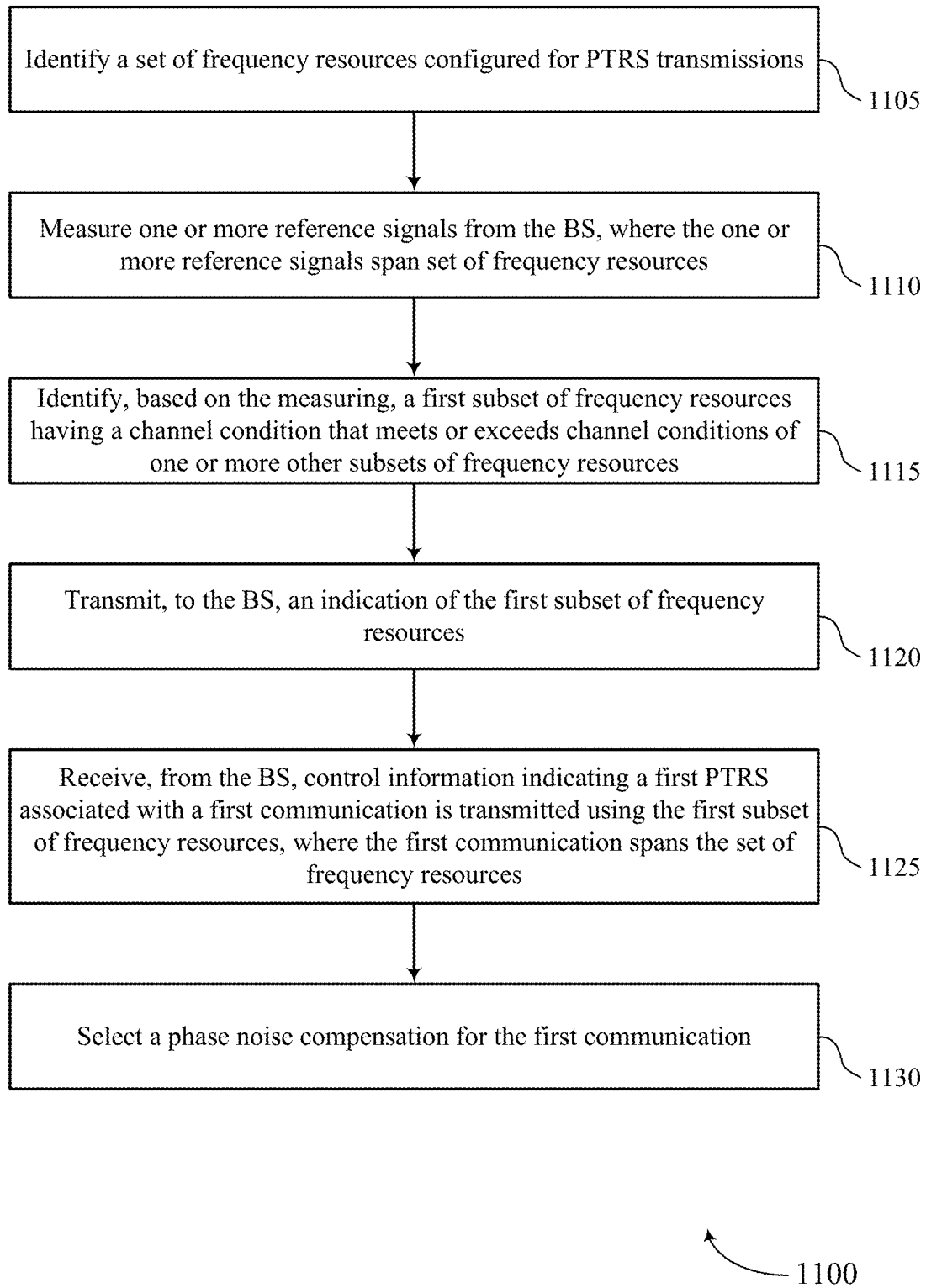

FIG. 11 shows a flowchart illustrating a method 1100 that supports frequency selective PTRS allocation. The operations of method 1100 may be implemented by a UE 115 or its components as described herein. For example, the operations of method 1100 may be performed by a communications manager as described with reference to FIG. 7. In some examples, a UE may execute a set of instructions to control the functional elements of the UE to perform the functions described below. Additionally or alternatively, a UE may perform aspects of the functions described below using special-purpose hardware.

At 1105, the UE may identify a set of frequency resources configured for PTRS transmissions. The operations of 1105 may be performed according to the methods described herein.

At 1110, the UE may measure one or more reference signals from the BS, where the one or more reference signals span set of frequency resources. The operations of 1110 may be performed according to the methods described herein.

At 1115, the UE may identify, based on the measuring, a first subset of frequency resources having a channel condition that meets or exceeds channel conditions of one or more other subsets of frequency resources. The operations of 1115 may be performed according to the methods described herein.

At 1120, the UE may transmit, to the BS, an indication of the first subset of frequency resources. The operations of 1120 may be performed according to the methods described herein.

At 1125, the UE may receive, from the BS, control information indicating a first PTRS associated with a first communication is transmitted using the first subset of frequency resources, where the first communication spans the set of frequency resources. The operations of 1125 may be performed according to the methods described herein.

At 1130, the UE may select a phase noise compensation for the first communication. The operations of 1130 may be performed according to the methods described herein.

Figure 12:
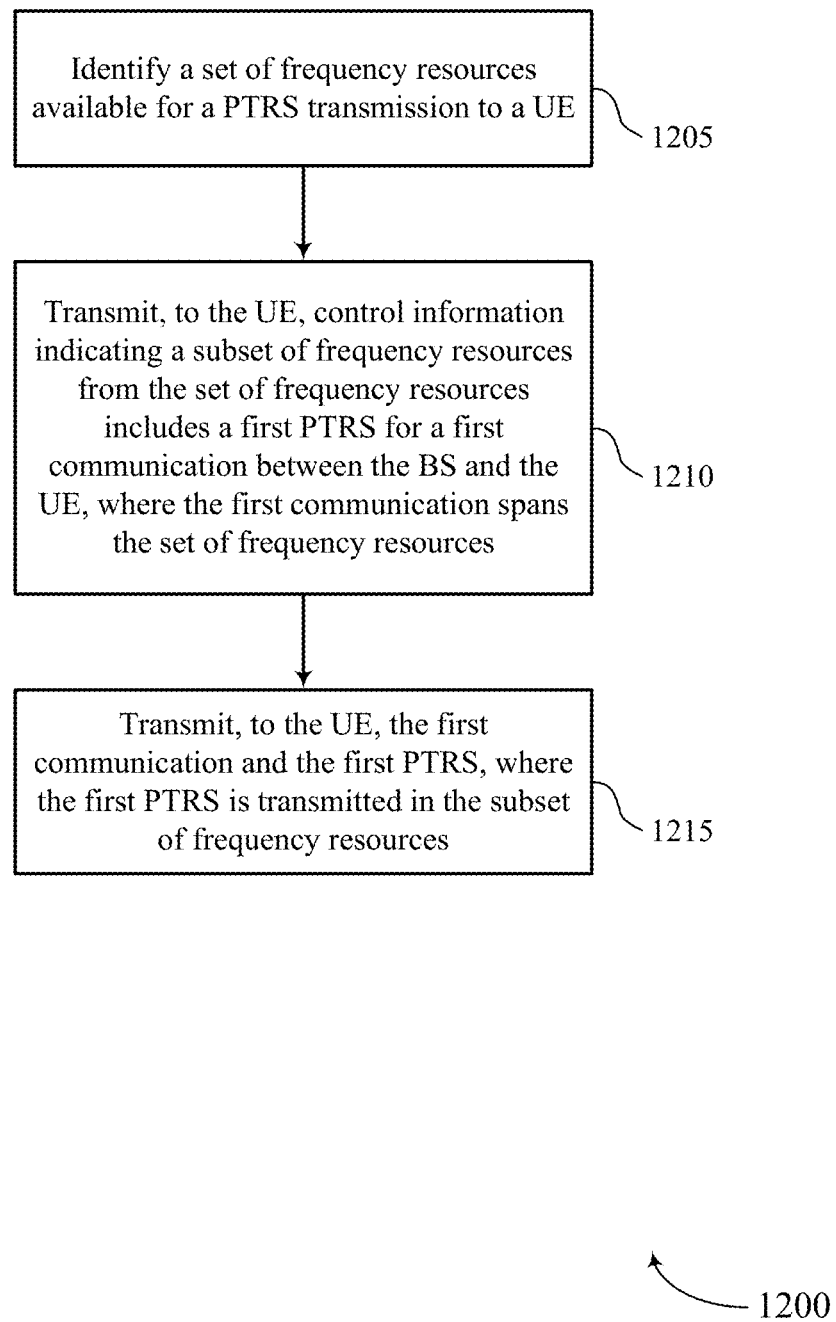

FIG. 12 shows a flowchart illustrating a method 1200 that supports frequency selective PTRS allocation. The operations of method 1200 may be implemented by a BS 105 or its components as described herein. For example, the operations of method 1200 may be performed by a communications manager as described with reference to FIG. 8. In some examples, a base station may execute a set of instructions to control the functional elements of the base station to perform the functions described below. Additionally or alternatively, a base station may perform aspects of the functions described below using special-purpose hardware.

At 1205, the base station may identify a set of frequency resources available for a PTRS transmission to a UE. The operations of 1205 may be performed according to the methods described herein.

At 1210, the base station may transmit, to the UE, control information indicating a subset of frequency resources from the set of frequency resources includes a first PTRS for a first communication between the BS and the UE, where the first communication spans the set of frequency resources. The operations of 1210 may be performed according to the methods described herein.

At 1215, the base station may transmit, to the UE, the first communication and the first PTRS, where the first PTRS is transmitted in the subset of frequency resources. The operations of 1215 may be performed according to the methods described herein.

Figure 13:
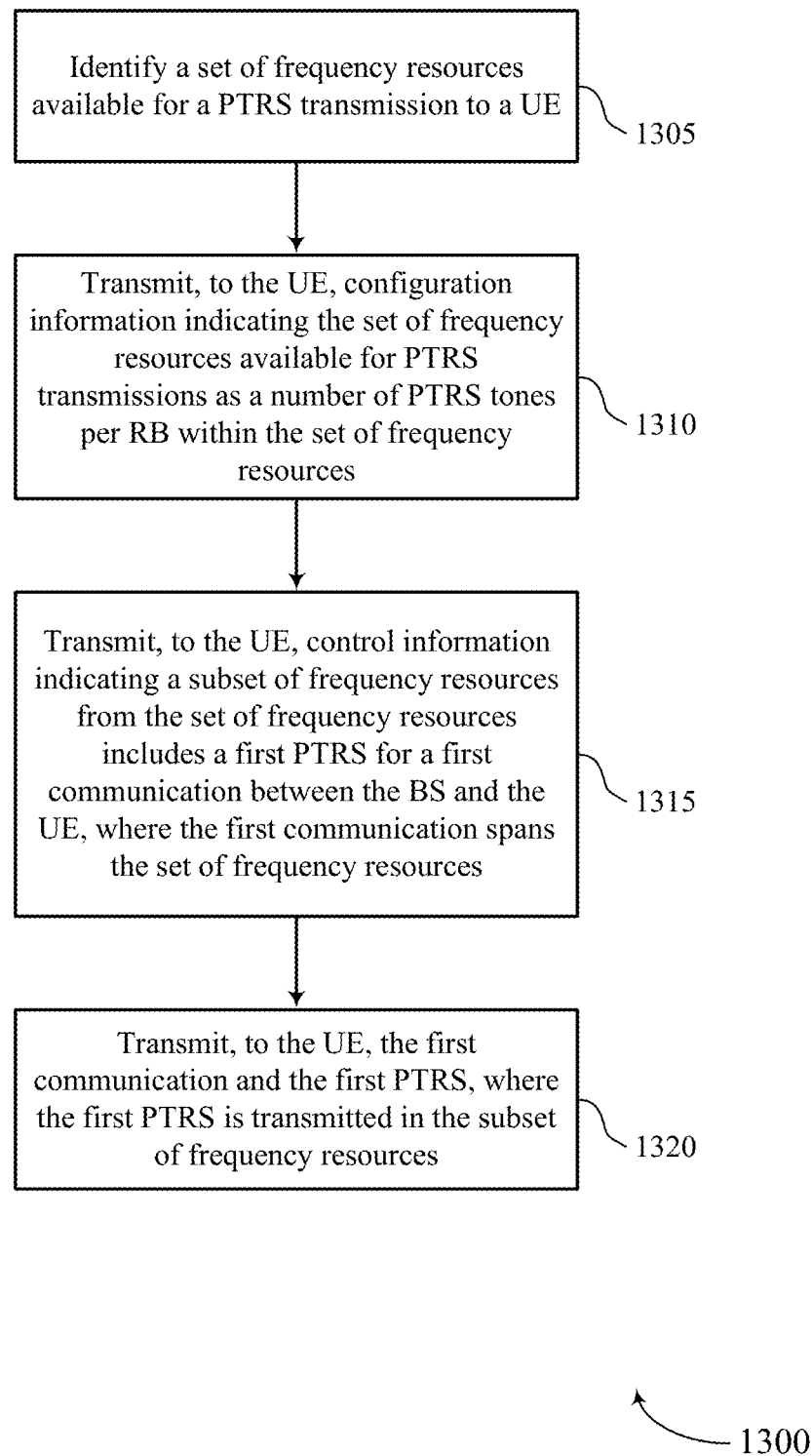

FIG. 13 shows a flowchart illustrating a method 1300 that supports frequency selective PTRS allocation. The operations of method 1300 may be implemented by a BS 105 or its components as described herein. For example, the operations of method 1300 may be performed by a communications manager as described with reference to FIG. 8. In some examples, a base station may execute a set of instructions to control the functional elements of the base station to perform the functions described below. Additionally or alternatively, a base station may perform aspects of the functions described below using special-purpose hardware.

At 1305, the base station may identify a set of frequency resources available for a PTRS transmission to a UE. The operations of 1305 may be performed according to the methods described herein.

At 1310, the base station may transmit, to the UE, configuration information indicating the set of frequency resources available for PTRS transmissions as a number of PTRS tones per RB within the set of frequency resources. The operations of 1310 may be performed according to the methods described herein.

At 1315, the base station may transmit, to the UE, control information indicating a subset of frequency resources from the set of frequency resources includes a first PTRS for a first communication between the BS and the UE, where the first communication spans the set of frequency resources. The operations of 1315 may be performed according to the methods described herein.

At 1320, the base station may transmit, to the UE, the first communication and the first PTRS, where the first PTRS is transmitted in the subset of frequency resources. The operations of 1320 may be performed according to the methods described herein.

The following provides an overview of some aspects of the present disclosure:

Aspect 1: A method for wireless communications at an apparatus of a UE, including: identifying a set of frequency resources configured for PTRS transmissions; receiving, from a BS, control information indicating a first PTRS associated with a first communication is transmitted using a subset of frequency resources from the set of frequency resources, where the first communication spans the set of frequency resources; and selecting a phase noise compensation for the first communication.

Aspect 2: The method of aspect 1, further including: receiving, from the BS, configuration information indicating the set of frequency resources available for PTRS transmissions as a number of PTRS tones per RB within the set of frequency resources.

Aspect 3: The method of aspect 2, where the configuration information provides: a plurality of frequency sub-bands as the set of frequency resources, a plurality of PTRS patterns within at least one of the plurality of frequency sub-bands, or any combinations thereof, and where the control information indicates a first frequency sub-band as the subset of frequency resources, and a first PTRS pattern, for the first PTRS.

Aspect 4: The method of any of aspects 1-3, where the receiving the control information includes: receiving, from the BS, a PTRS index value in the control information; and selecting, based at least in part on the PTRS index value, the subset of frequency resources and a pattern of REs within the subset of frequency resources that contain the first PTRS.

Aspect 5: The method of any of aspects 1-3, further including: identifying a resource partition indication in the control information that indicates a first resource partition within a set of RBs allocated for communications between the UE and the BS; identifying an offset indication in the control information that indicates a first offset within the first resource partition; and selecting the subset of frequency resources based at least in part on the first resource partition and the first offset.

Aspect 6: The method of aspect 5, further including: identifying a PTRS pattern indication in the control information that indicates a RE pattern for the first PTRS within the subset of frequency resources.

Aspect 7: The method of any of aspects 1-6, further including: measuring one or more reference signals from the BS, where the one or more reference signals span set of frequency resources; identifying, based at least in part on the measuring, a first subset of frequency resources having a channel condition that meets or exceeds channel conditions of one or more other subsets of frequency resources; and transmitting, to the BS, an indication of the first subset of frequency resources, and where the control information indicates the first subset of frequency resources contains the first PTRS.

Aspect 8: The method of aspect 7, where the first PTRS includes a first number of tones within the first subset of frequency resources based on a frequency density parameter associated with the set of frequency resources.

Aspect 9: The method of aspect 8, where the first number of tones within the first subset of frequency resources are power boosted to provide an aggregate power level that matches a total power associated with a total number of PTRS tones that span the set of frequency resources.

Aspect 10: The method of any of aspects 7-9, where the transmitting further includes: transmitting, based at least in part on the measuring, a total number of tones requested for the PTRS for the first communication.

Aspect 11: The method of any of aspects 7-10, further including: selecting a TB size of the first communication based at least in part on an indicated TB size or an overhead parameter for TB size calculation, and a number of PTRS tones in the first subset of frequency resources.

Aspect 12: The method of aspect 11, where the TB size of the first communication is adjusted relative to the indicated TB size or a calculated TB size to account for reduced PTRS overhead based on PTRS tones being transmitted only in the first subset of frequency resources.

Aspect 13: The method of any of aspects 7-12, where the control information indicates a TB size of the first communication that is adjusted for a reduced PTRS overhead based on PTRS tones being transmitted only in the first subset of frequency resources.

Aspect 14: The method of any of aspects 1-13, further including: receiving, from the BS, control signaling to activate or deactivate PTRS frequency resource indications, where the control signaling is received in one or more of RRC signaling or a MAC control element.

Aspect 15: The method of aspect 14, where the control signaling includes a threshold value of RBs for activating the PTRS frequency resource indications provided by the control information.

Aspect 16: A method for wireless communications at an apparatus of a BS, including: identifying a set of frequency resources available for a PTRS transmission to a UE; transmitting, to the UE, control information indicating a subset of frequency resources from the set of frequency resources includes a first PTRS for a first communication between the BS and the UE, where the first communication spans the set of frequency resources; and transmitting, to the UE, the first communication and the first PTRS, where the first PTRS is transmitted in the subset of frequency resources.

Aspect 17: The method of aspect 16, further including: transmitting, to the UE, configuration information indicating the set of frequency resources available for PTRS transmissions as a number of PTRS tones per RB within the set of frequency resources.

Aspect 18: The method of aspect 17, where the configuration information provides: a plurality of frequency sub-bands as the set of frequency resources, a plurality of PTRS patterns within at least one of the plurality of frequency sub-bands, or any combinations thereof, and where the control information indicates a first frequency sub-band as the subset of frequency resources, and a first PTRS pattern, for the first PTRS.

Aspect 19: The method of any of aspects 16-18, where the transmitting the control information includes: selecting a PTRS index value of the first PTRS based at least in part on the subset of frequency resources and a pattern of REs within the subset of frequency resources that contain the first PTRS; and transmitting, to the UE, the PTRS index value in the control information.

Aspect 20: The method of any of aspects 16-18, further including: transmitting, in the control information, a location of the subset of frequency resources as a resource partition indication that indicates a first resource partition within a set of RBs allocated for communications between the UE and the BS, and an offset indication that indicates a first offset within the first resource partition.

Aspect 21: The method of aspect 20, further including: transmitting, in the control information, a PTRS pattern indication for a resource element (RE) pattern for the first PTRS within the subset of frequency resources.

Aspect 22: The method of any of aspects 16-21, further including: selecting, based at least in part on one or more of a measurement report from the UE, one or more measurements of a UE reference signal, one or more resource allocations to one or more other UEs, or any combinations thereof, a first subset of frequency resources from the set of frequency resources has a channel condition that meets or exceeds channel conditions of one or more other subsets of frequency resources, and where the control information indicates the first subset of frequency resources contains the first PTRS.

Aspect 23: The method of aspect 22, where the first PTRS includes a first number of tones within the first subset of frequency resources based on a frequency density parameter associated with the set of frequency resources.

Aspect 24: The method of aspect 23, where the first number of tones within the first subset of frequency resources are power boosted to provide an aggregate power level that matches a total power associated with a total number of PTRS tones that span the set of frequency resources.

Aspect 25: The method of any of aspects 22-24, further including: receiving, from the UE, an indication of a total number of tones requested for the PTRS for the first communication.

Aspect 26: The method of any of aspects 22-25, further including: selecting a TB size of the first communication based at least in part on an indicated TB size in the control information and a number of PTRS tones in the first subset of frequency resources.

Aspect 27: The method of aspect 26, where the TB size of the first communication is adjusted relative to the indicated TB size to account for reduced PTRS overhead based on PTRS tones being transmitted only in the first subset of frequency resources.

Aspect 28: The method of any of aspects 22-27, where the control information indicates a TB size of the first communication that is adjusted for a reduced PTRS overhead based on PTRS tones being transmitted only in the first subset of frequency resources.

Aspect 29: The method of any of aspects 16-28, further including: transmitting, to the UE, control signaling to activate or deactivate PTRS frequency resource indications, where the control signaling is transmitted in one or more of RRC signaling or a medium access control (MAC) control element.

Aspect 30: The method of aspect 29, where the control signaling includes a threshold value of resource blocks (RBs) for activating the PTRS frequency resource indications provided by the control information.

Aspect 31: The method of any of aspects 16-30, where the first PTRS is transmitted in a plurality of tones of the subset of frequency resources, and where different tones of the plurality of tones have a different transmit power based on an estimated channel condition associated with each tone.

Aspect 32: The method of aspect 31, where the transmit power for the plurality of tones of the subset of frequency resources is determined to provide utilization of a total available transmit power for the first PTRS.

Aspect 33: The method of any of aspects 31-32, where the BS selects a PTRS pattern that includes one or more zero power tones based on the estimated channel condition, the PTRS pattern being selected from a set of pre-defined patterns, and where an index of the PTRS pattern is signaled to the UE via the control information.

Aspect 34: An apparatus for wireless communications at a UE, including at least a first interface, and a processing system configured to cause the apparatus to perform a method of any of aspects 1 through 15.

Aspect 35: An apparatus for wireless communications at a UE, including a processor; memory coupled with the processor; and instructions stored in the memory and executable by the processor to cause the apparatus to perform a method of any of aspects 1 through 15.

Aspect 36: An apparatus for wireless communications at a UE, including at least one means for performing a method of any of aspects 1 through 15.

Aspect 37: A non-transitory computer-readable medium storing code for wireless communications at a UE, the code including instructions executable by a processor to perform a method of any of aspects 1 through 15.

Aspect 38: An apparatus for wireless communications at a BS, including at least a first interface, and a processing system configured to cause the apparatus to perform a method of any of aspects 16 through 33.

Aspect 39: An apparatus for wireless communications at a BS, including a processor; memory coupled with the processor; and instructions stored in the memory and executable by the processor to cause the apparatus to perform a method of any of aspects 16 through 33.

Aspect 40: An apparatus for wireless communications at a BS, including at least one means for performing a method of any of aspects 16 through 33.

Aspect 41: A non-transitory computer-readable medium storing code for wireless communications at a BS, the code including instructions executable by a processor to perform a method of any of aspects 16 through 33.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can, in some implementations, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications at a user equipment (UE), comprising:
   a first interface configured to:
      obtain configuration information indicating frequency resources available for phase tracking reference signal (PTRS) transmissions as a quantity of PTRS tones per resource block (RB) within a set of frequency resources configured for the PTRS transmissions; and
      obtain control information indicating that a first PTRS associated with a first communication is using a subset of frequency resources from the set of frequency resources configured for the PTRS transmissions, the first communication spanning the set of frequency resources configured for the PTRS transmissions; and
   a processing system configured to:
      select a phase noise compensation for the first communication.

2. The apparatus of claim 1, wherein:
   the configuration information provides:
      a plurality of frequency sub-bands as the set of frequency resources,
      a plurality of PTRS patterns within at least one of the plurality of frequency sub-bands, or
      any combinations thereof, and
   wherein the control information indicates a first frequency sub-band as the subset of frequency resources, and a first PTRS pattern, for the first PTRS.

3. The apparatus of claim 1, wherein:
   the first interface or a second interface is configured to:
      obtain a PTRS index value in the control information; and
   the processing system is further configured to:
      select, in accordance with the PTRS index value, the subset of frequency resources and a pattern of resource elements (REs) within the subset of frequency resources that contains the first PTRS.

4. The apparatus of claim 1, wherein:
   the processing system is further configured to:
      identify a resource partition indication in the control information that indicates a first resource partition within a set of resource blocks (RBs) allocated for communications between the UE and a network device;
      identify an offset indication in the control information that indicates a first offset within the first resource partition; and
      select the subset of frequency resources in accordance with the first resource partition and the first offset.

5. The apparatus of claim 4, wherein:
   the processing system is further configured to:
      identify a PTRS pattern indication in the control information that indicates a resource element (RE) pattern for the first PTRS within the subset of frequency resources.

6. The apparatus of claim 1, wherein:
   the processing system is further configured to:
      measure one or more reference signals, the one or more reference signals spanning the set of frequency resources; and
      identify, in accordance with the measuring, a first subset of frequency resources having a channel condition that meets or exceeds channel conditions of one or more other subsets of frequency resources; and
   the first interface or a second interface is configured to:
      output an indication of the first subset of frequency resources, the control information indicating that the first subset of frequency resources contains the first PTRS.

7. The apparatus of claim 6, wherein:
   the first PTRS includes a first quantity of tones within the first subset of frequency resources in accordance with a frequency density parameter associated with the set of frequency resources.

8. The apparatus of claim 7, wherein:
the first quantity of tones within the first subset of frequency resources are power boosted to provide an aggregate power level that matches a total power associated with a total quantity of PTRS tones that span the set of frequency resources.

9. The apparatus of claim 6, wherein:
the first interface or the second interface is configured to:
output a total quantity of tones requested for the first PTRS for the first communication.

10. The apparatus of claim 6, wherein:
the processing system is further configured to:
select a transport block (TB) size of the first communication in accordance with an indicated TB size or an overhead parameter for TB size calculation, and in accordance with a first quantity of PTRS tones in the first subset of frequency resources.

11. The apparatus of claim 1, wherein:
the first interface or a second interface is configured to:
obtain control signaling to activate or deactivate PTRS frequency resource indications, the control signaling provided in one or more of radio resource control (RRC) signaling or a medium access control (MAC) control element, and the control signaling including a threshold value of resource blocks (RBs) for activating the PTRS frequency resource indications provided by the control information.

12. An apparatus for wireless communications at a network device, comprising:
a processing system; and
a first interface configured to:
output configuration information for a user equipment (UE), the configuration information indicating frequency resources available for phase tracking reference signal (PTRS) transmissions as a quantity of PTRS tones per resource block (RB) within a set of frequency resources configured for the PTRS transmissions;
output, for the UE, control information indicating that a subset of frequency resources from the set of frequency resources configured for the PTRS transmissions includes a first PTRS for a first communication between the network device and the UE, the first communication spanning the set of frequency resources configured for the PTRS transmissions; and
output, for the UE, the first communication and the first PTRS, the first PTRS being transmitted via the subset of frequency resources.

13. The apparatus of claim 12, wherein:
the configuration information provides:
a plurality of frequency sub-bands as the set of frequency resources,
a plurality of PTRS patterns within at least one of the plurality of frequency sub-bands, or
any combinations thereof, and
wherein the control information indicates a first frequency sub-band as the subset of frequency resources, and a first PTRS pattern, for the first PTRS.

14. The apparatus of claim 12, wherein:
the processing system is configured to:
select a PTRS index value of the first PTRS in accordance with the subset of frequency resources and a pattern of resource elements (REs) within the subset of frequency resources that contains the first PTRS; and the first interface or a second interface is configured to:
output, to the UE, the PTRS index value in the control information.

15. The apparatus of claim 12, wherein:
the first interface or a second interface is configured to:
output, in the control information, a location of the subset of frequency resources as a resource partition indication that indicates a first resource partition within a set of resource blocks (RBs) allocated for communications between the UE and the network device, and an offset indication that indicates a first offset within the first resource partition.

16. The apparatus of claim 15, wherein:
the first interface or the second interface is configured to:
output, in the control information, a PTRS pattern indication for a resource element (RE) pattern for the first PTRS within the subset of frequency resources.

17. The apparatus of claim 12, wherein:
the processing system is configured to:
determine, in accordance with one or more of a measurement report from the UE, one or more measurements of a UE reference signal, one or more resource allocations to one or more other UEs, or any combinations thereof, that a first subset of frequency resources from the set of frequency resources has a channel condition that meets or exceeds channel conditions of one or more other subsets of frequency resources; and
wherein the control information indicates that the first subset of frequency resources contains the first PTRS.

18. The apparatus of claim 17, wherein:
the first PTRS includes a first quantity of tones within the first subset of frequency resources in accordance with a frequency density parameter associated with the set of frequency resources.

19. The apparatus of claim 18, wherein:
the first quantity of tones within the first subset of frequency resources are power boosted to provide an aggregate power level that matches a total power associated with a total quantity of PTRS tones that span the set of frequency resources.

20. The apparatus of claim 17, wherein:
the first interface or a second interface is configured to:
obtain an indication of a total quantity of tones requested for the first PTRS for the first communication.

21. The apparatus of claim 17, wherein:
the processing system is further configured to:
select a transport block (TB) size of the first communication in accordance with an indicated TB size in the control information and a first quantity of PTRS tones in the first subset of frequency resources.

22. The apparatus of claim 12, wherein:
the first interface or a second interface is configured to:
output, to the UE, control signaling to activate or deactivate PTRS frequency resource indications, the control signaling provided in one or more of radio resource control (RRC) signaling or a medium access control (MAC) control element, and the control signaling including a threshold value of resource blocks (RBs) for activating the PTRS frequency resource indications provided by the control information.

23. The apparatus of claim 12, wherein:
the first PTRS is transmitted via a plurality of tones of the subset of frequency resources, and wherein at least two tones of the plurality of tones have a different transmit power according to an estimated channel condition associated with each tone of the at least two tones.

24. A method for wireless communications at an apparatus of a user equipment (UE), comprising:
receiving configuration information indicating frequency resources available for phase tracking reference signal (PTRS) transmissions as a quantity of PTRS tones per resource block (RB) within a set of frequency resources configured for the PTRS transmissions;
receiving control information indicating that a first PTRS associated with a first communication is transmitted using a subset of frequency resources from the set of frequency resources configured for the PTRS transmissions, the first communication spanning the set of frequency resources configured for the PTRS transmissions; and
selecting a phase noise compensation for the first communication.

25. The method of claim 24, further comprising:
measuring one or more reference signals, the one or more reference signals spanning the set of frequency resources;
identifying, in accordance with the measuring, a first subset of frequency resources having a channel condition that meets or exceeds channel conditions of one or more other subsets of frequency resources; and
transmitting an indication of the first subset of frequency resources, the control information indicating that the first subset of frequency resources contains the first PTRS.

26. The method of claim 24, wherein:
the configuration information provides:
a plurality of frequency sub-bands as the set of frequency resources,
a plurality of PTRS patterns within at least one of the plurality of frequency sub-bands, or
any combinations thereof, and
wherein the control information indicates a first frequency sub-band as the subset of frequency resources, and a first PTRS pattern, for the first PTRS.

27. The method of claim 24, further comprising:
receiving a PTRS index value in the control information; and
selecting, in accordance with the PTRS index value, the subset of frequency resources and a pattern of resource elements (REs) within the subset of frequency resources that contains the first PTRS.

28. A method for wireless communications at an apparatus of a network device, comprising:
transmitting configuration information for a user equipment (UE), the configuration information indicating frequency resources available for phase tracking reference signal (PTRS) transmissions as a quantity of PTRS tones per resource block (RB) within a set of frequency resources configured for the PTRS transmissions;
transmitting, for the UE, control information indicating that a subset of frequency resources from the set of frequency resources configured for the PTRS transmissions includes a first PTRS for a first communication between the network device and the UE, the first communication spanning the set of frequency resources configured for the PTRS transmissions; and
transmitting, for the UE, the first communication and the first PTRS, the first PTRS being transmitted via the subset of frequency resources.

29. The method of claim 28, wherein:
the configuration information provides:
a plurality of frequency sub-bands as the set of frequency resources,
a plurality of PTRS patterns within at least one of the plurality of frequency sub-bands, or
any combinations thereof, and
wherein the control information indicates a first frequency sub-band as the subset of frequency resources, and a first PTRS pattern, for the first PTRS.

30. The method of claim 28, further comprising:
selecting a PTRS index value of the first PTRS in accordance with the subset of frequency resources and a pattern of resource elements (REs) within the subset of frequency resources that contains the first PTRS; and
transmitting, for the UE, the PTRS index value in the control information.

* * * * *